United States Patent [19]

Mallozzi et al.

[11] 4,058,486
[45] Nov. 15, 1977

[54] PRODUCING X-RAYS

[75] Inventors: Philip J. Mallozzi; Harold M. Epstein; Richard G. Jung; David C. Applebaum; Barry P. Fairand, all of Columbus; William J. Gallagher, Worthington, all of Ohio

[73] Assignee: Battelle Memorial Institute, Columbus, Ohio

[21] Appl. No.: 319,756

[22] Filed: Dec. 29, 1972

[51] Int. Cl.² .............................................. G21G 4/00
[52] U.S. Cl. .................................................. 250/493
[58] Field of Search ...................... 250/92, 401 P, 493; 331/94.5 A, 94.5 GP; 176/1

[56] References Cited

U.S. PATENT DOCUMENTS

| 3,498,645 | 1/1970 | Daiber et al. | 176/1 |
| 3,723,246 | 3/1973 | Lubin | 176/1 |
| 3,746,860 | 7/1973 | Smatas et al. | 250/493 |

OTHER PUBLICATIONS

Mead et al., "Preliminary Measurements of X-ray . . . from Laser–Produced, Plasmas"; 2/72, pp. 345–352, Applied Optics, vol. 11, # 2.
Dhez et al. "Same Characteristics . . . on an Aluminum Target," 5/69, pp. 2545–2548, Jour. Appl. Physics, vol. 40, # 6.

*Primary Examiner*—Nelson Moskowitz
*Attorney, Agent, or Firm*—Philip M. Dunson

[57] ABSTRACT

A method of producing X-rays by directing radiant energy from a laser onto a target. Conversion efficiency of at least about 3 percent is obtained by providing the radiant energy in a low-power precursor pulse of approximately uniform effective intensity focused onto the surface of the target for about 1 to 30 nanoseconds so as to generate an expanding unconfined coronal plasma having less than normal solid density throughout and comprising a low-density (underdense) region wherein the plasma frequency is less than the laser radiation frequency and a higher-density (overdense) region wherein the plasma frequency is greater than the laser radiation frequency and, about 1 to 30 nanoseconds after the precursor pulse strikes the target, a higher-power main pulse focused onto the plasma for about $10^{-3}$ to 30 nanoseconds and having such power density and total energy that the radiant energy is absorbed in the underdense region and conducted into the overdense region to heat it and thus to produce X-rays therefrom with the plasma remaining substantially below normal solid density and thus facilitating the substantial emission of X-rays in the form of spectral lines arising from nonequilibrium ionization states.

The X-rays may be produced essentially as from a point source (i.e., they are spatially coherent) and thus are suitable for many applications that would otherwise require an X-ray laser. In some embodiments phase coherence is achieved, thus providing a true X-ray laser.

In a similar method, providing a controlled nuclear fusion reaction, the target comprises alternate layers of high-Z and lower-Z material.

20 Claims, 33 Drawing Figures

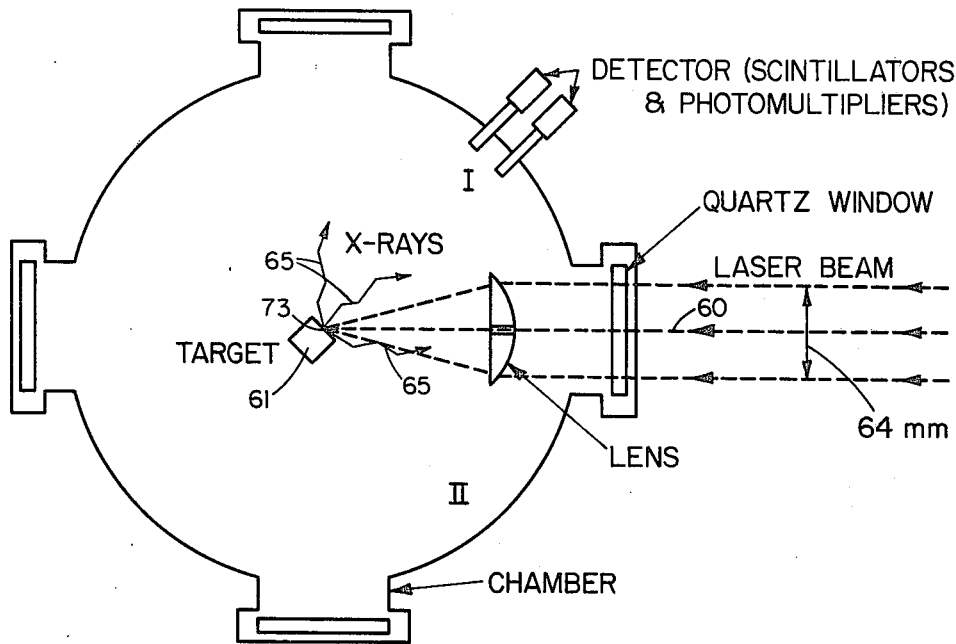
FIG. I. BASIC EXPERIMENTAL CONFIGURATION USED FOR X-RAY PRODUCTION
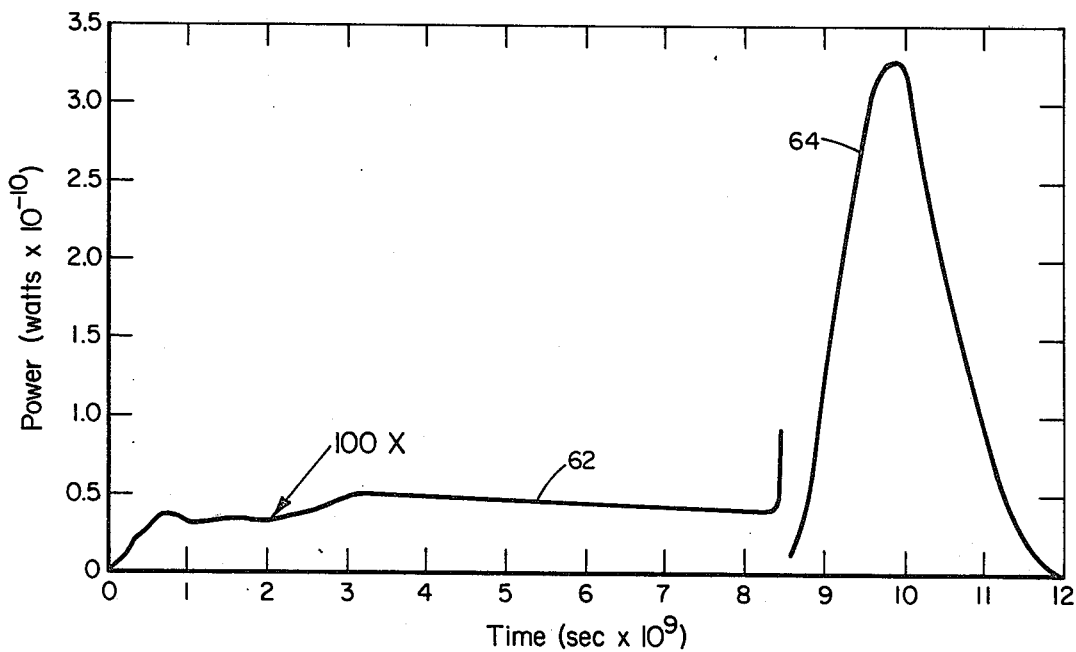
FIG. 2. LASER PULSE WITH FOOT

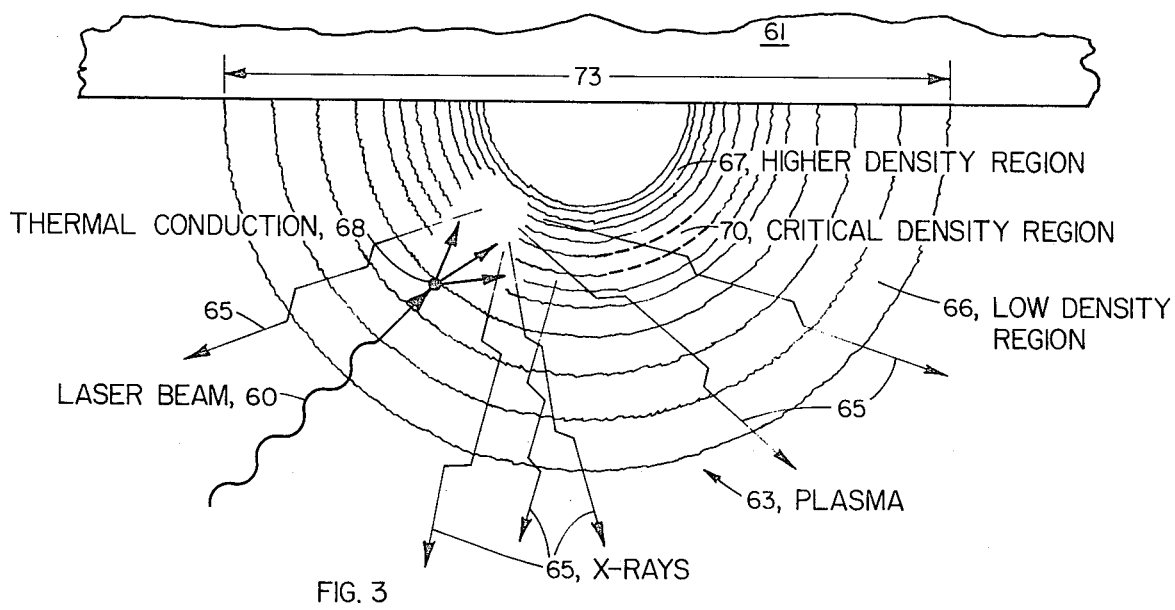
FIG. 3
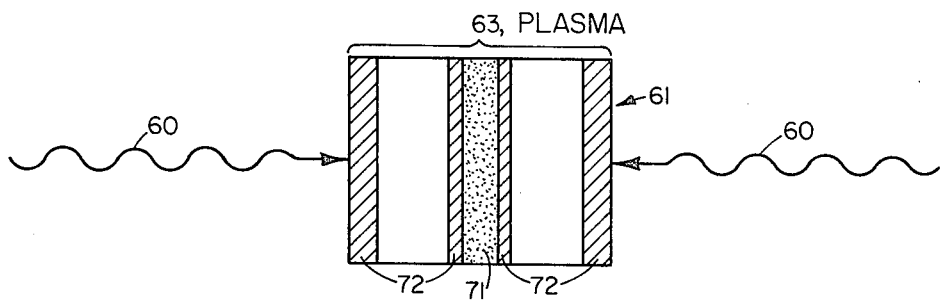
FIG. 4
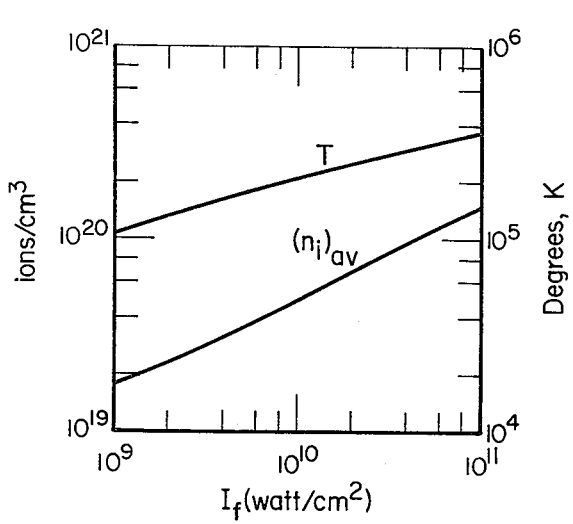
FIG. 5. TEMPERATURE AND AVERAGE ION DENSITY OF INITIAL IRON PLASMA AS PREDICTED BY EQUATIONS (A-27) AND (A-29)
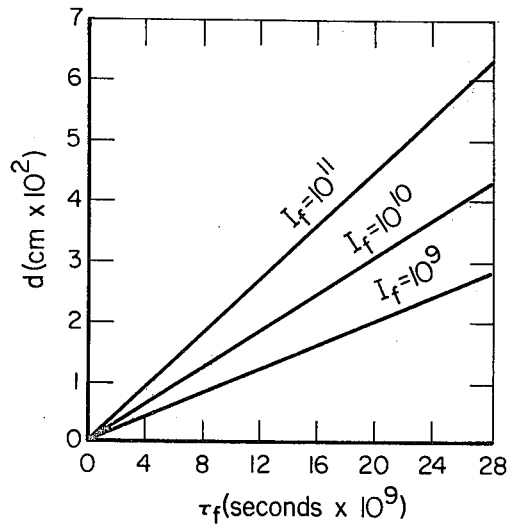
FIG. 6. THICKNESS OF INITIAL IRON PLASMA AS PREDICTED BY EQUATION (A-28)

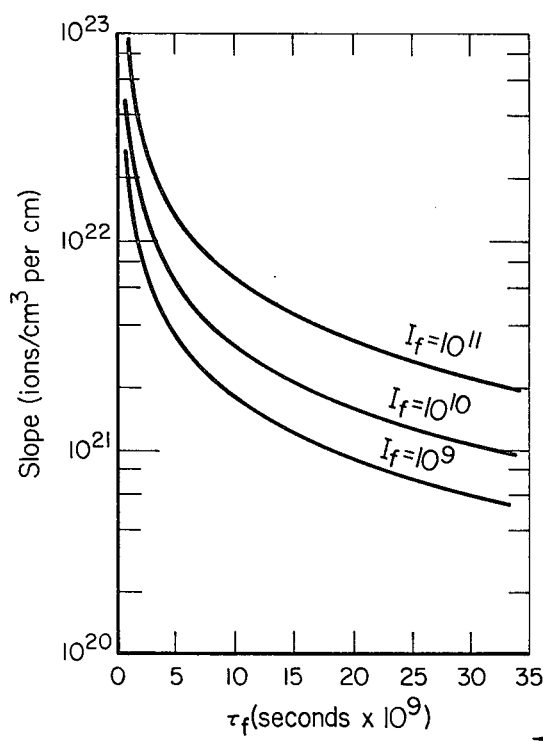
FIG. 7. SLOPE OF ION DENSITY PROFILE OF INITIAL IRON PLASMA CALCULATED BY PROCEDURE DESCRIBED IN THE TEXT
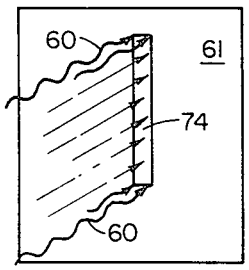
FIG. 8
FIG. 9
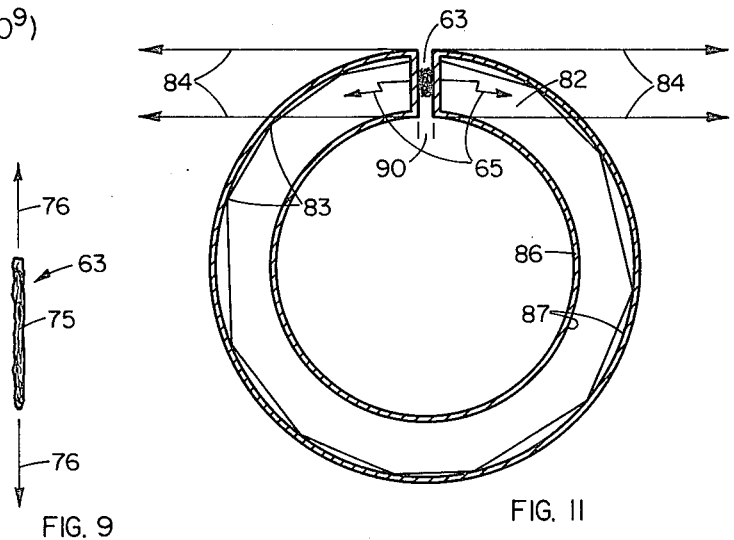
FIG. 11
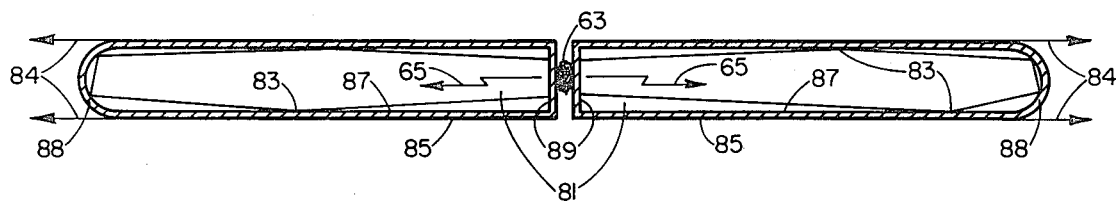
FIG. 10

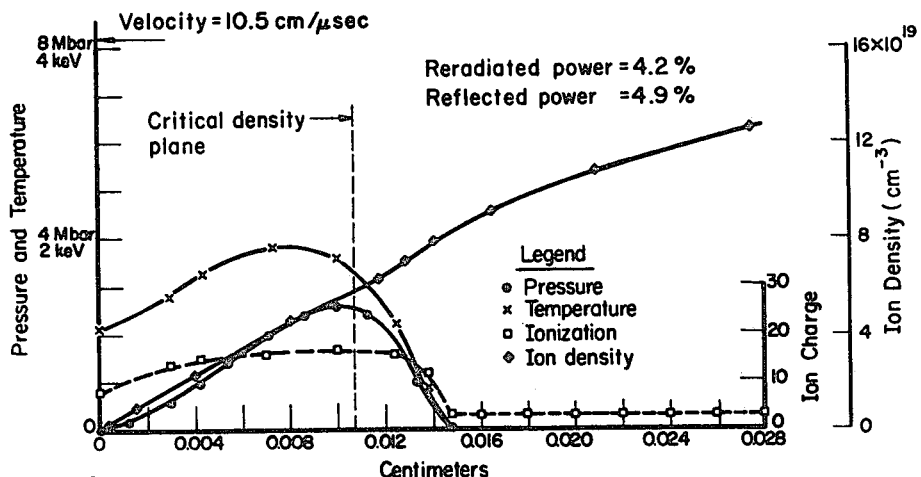
FIG. 12  Time = 33.4 Picoseconds
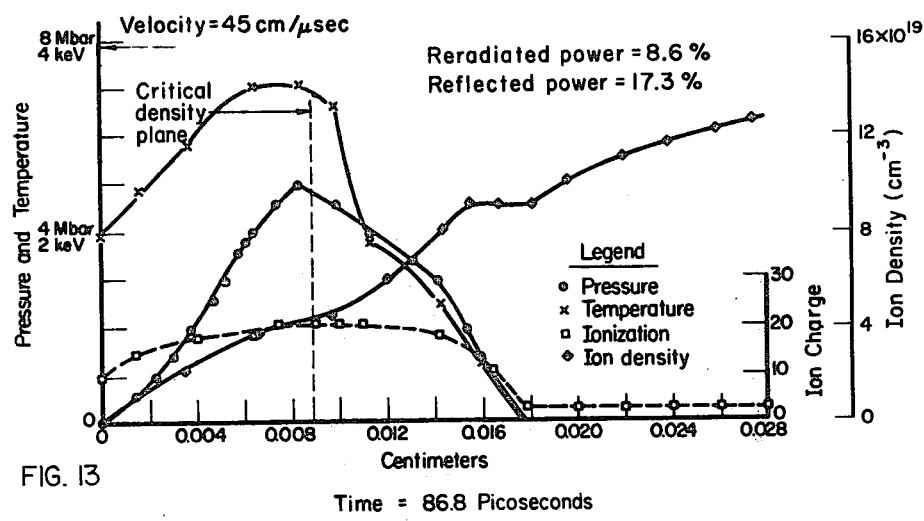
FIG. 13  Time = 86.8 Picoseconds
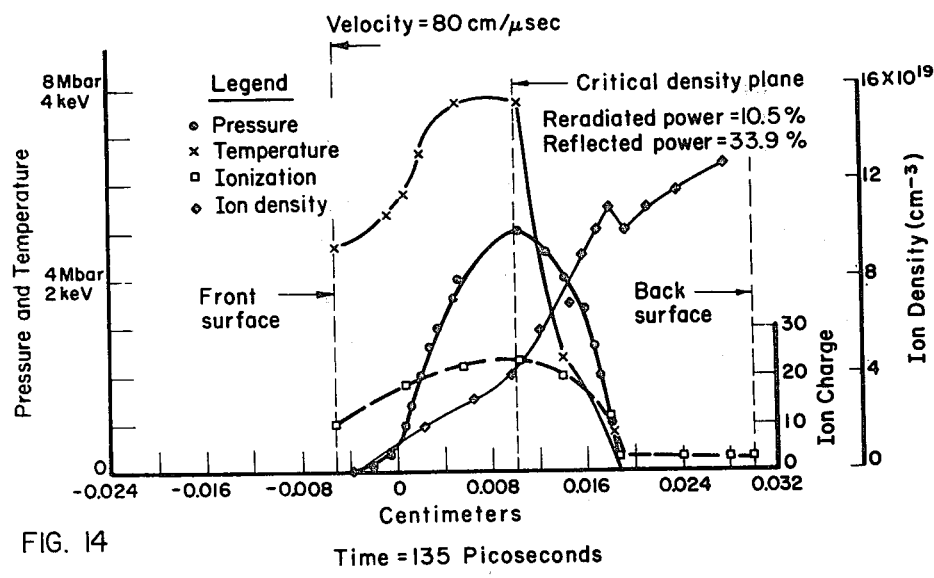
FIG. 14  Time = 135 Picoseconds

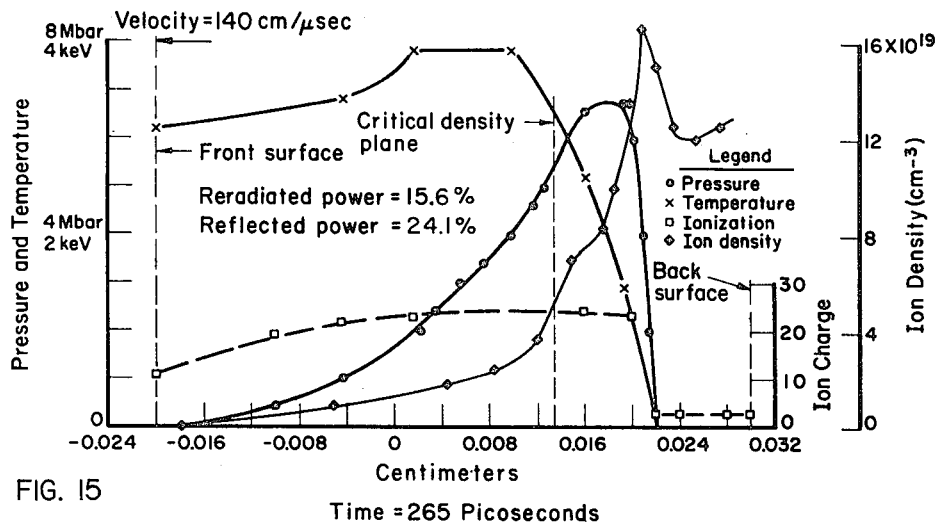
FIG. 15 Time = 265 Picoseconds
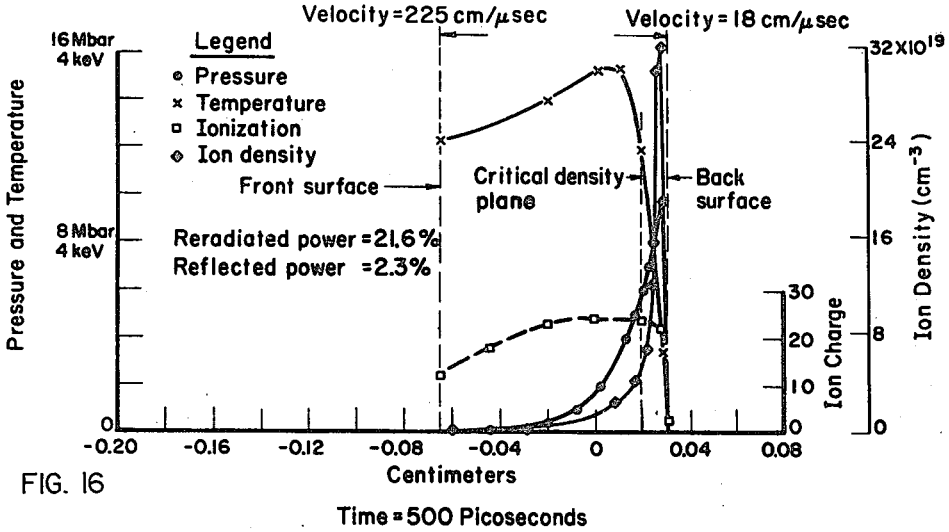
FIG. 16 Time = 500 Picoseconds
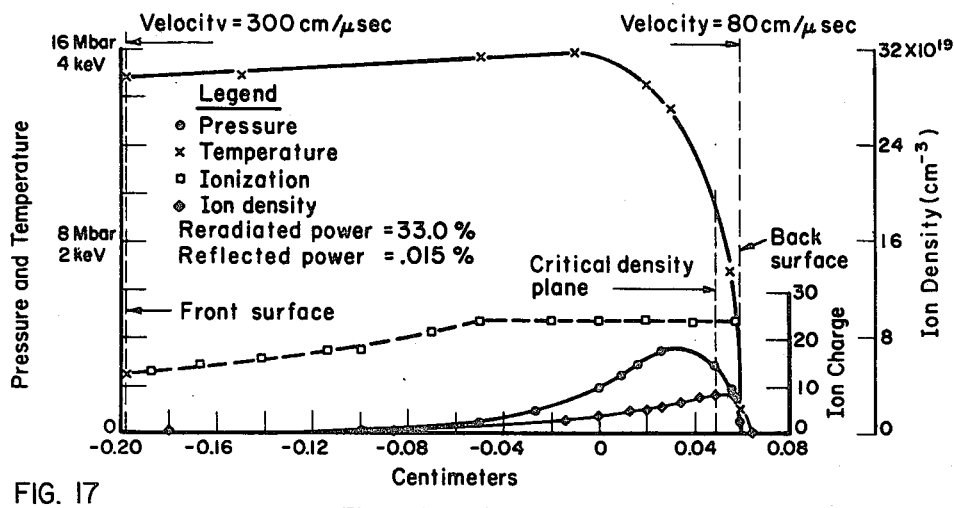
FIG. 17 Time = 1000 Picoseconds

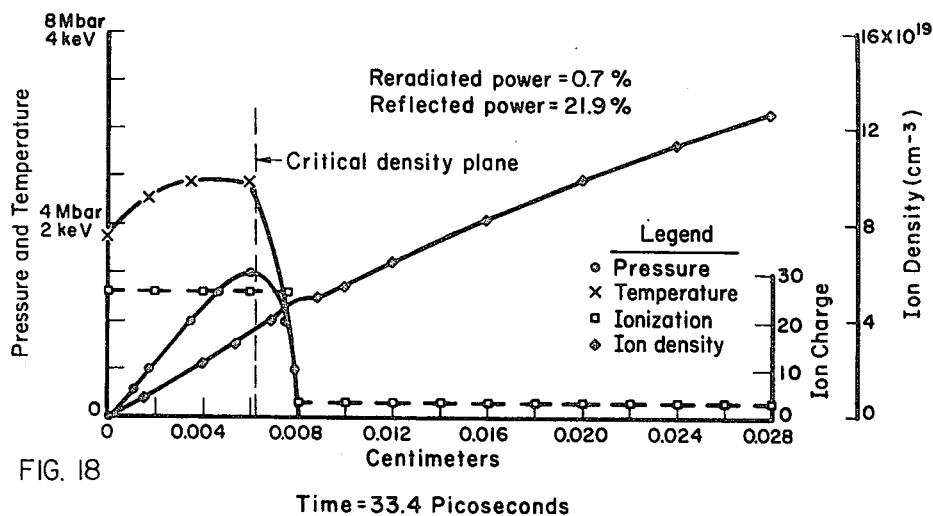
FIG. 18  Time = 33.4 Picoseconds
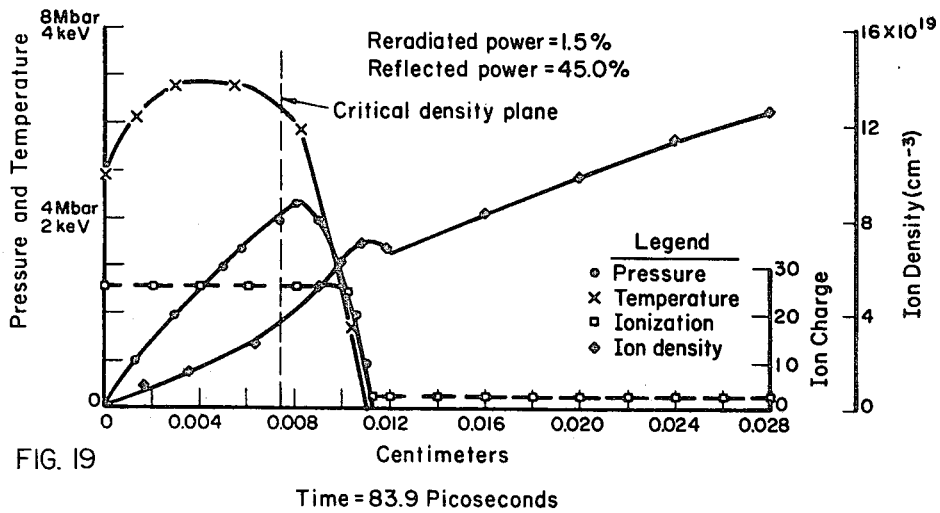
FIG. 19  Time = 83.9 Picoseconds
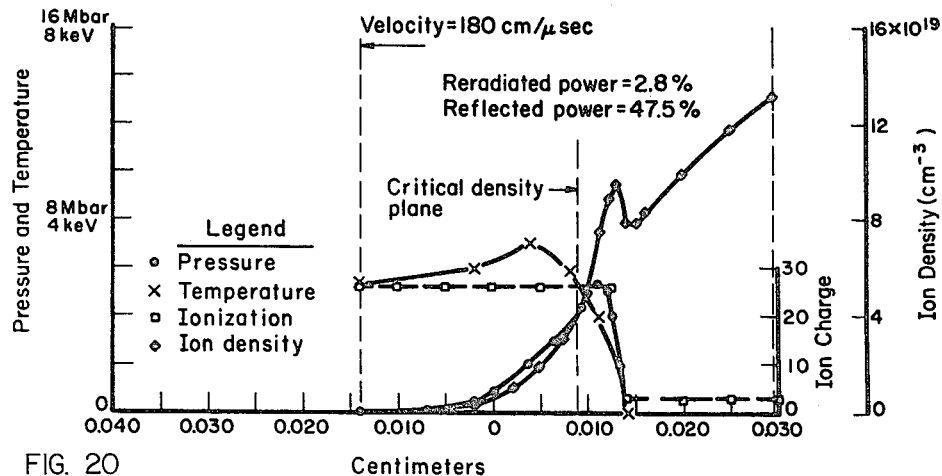
FIG. 20  Time = 143 Picoseconds

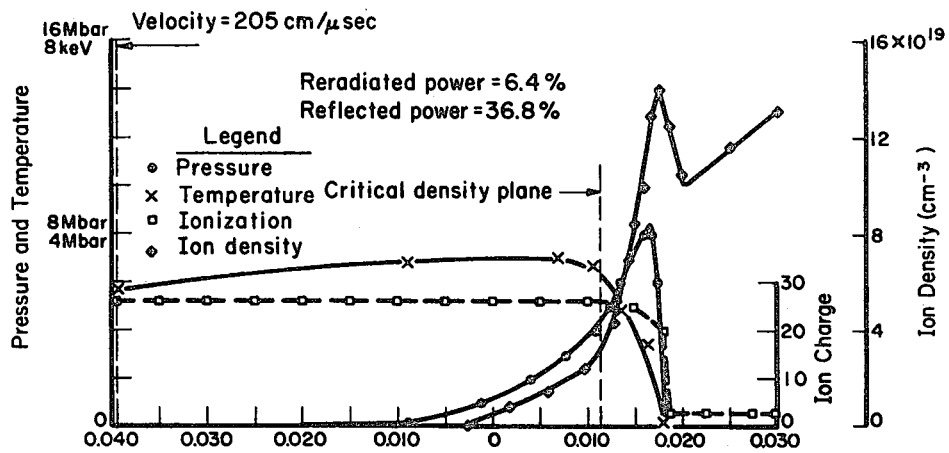
FIG. 21 Time = 256 Picoseconds
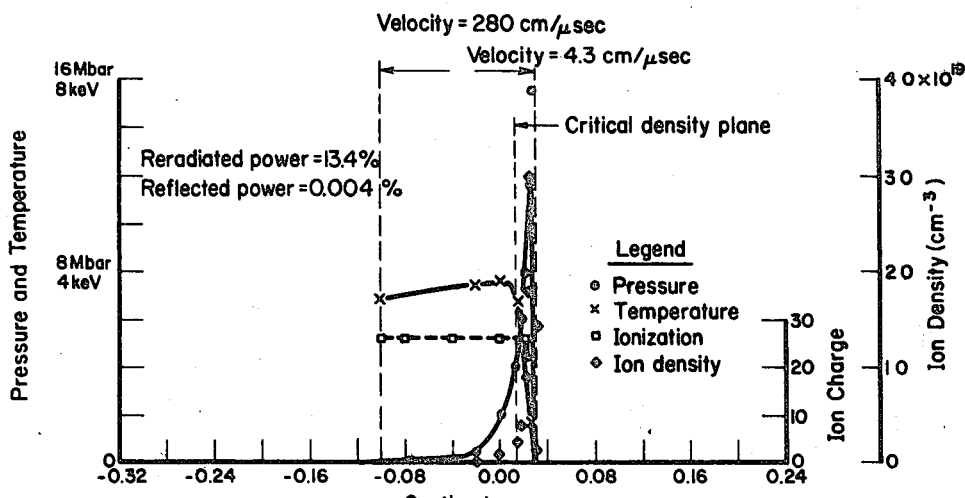
FIG. 22 Time = 502 Picoseconds
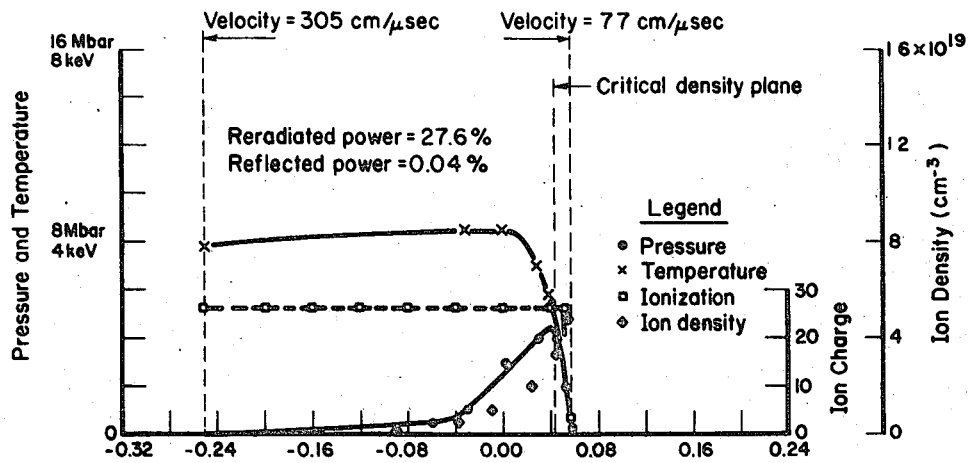
FIG. 23 Time = 1000 Picoseconds

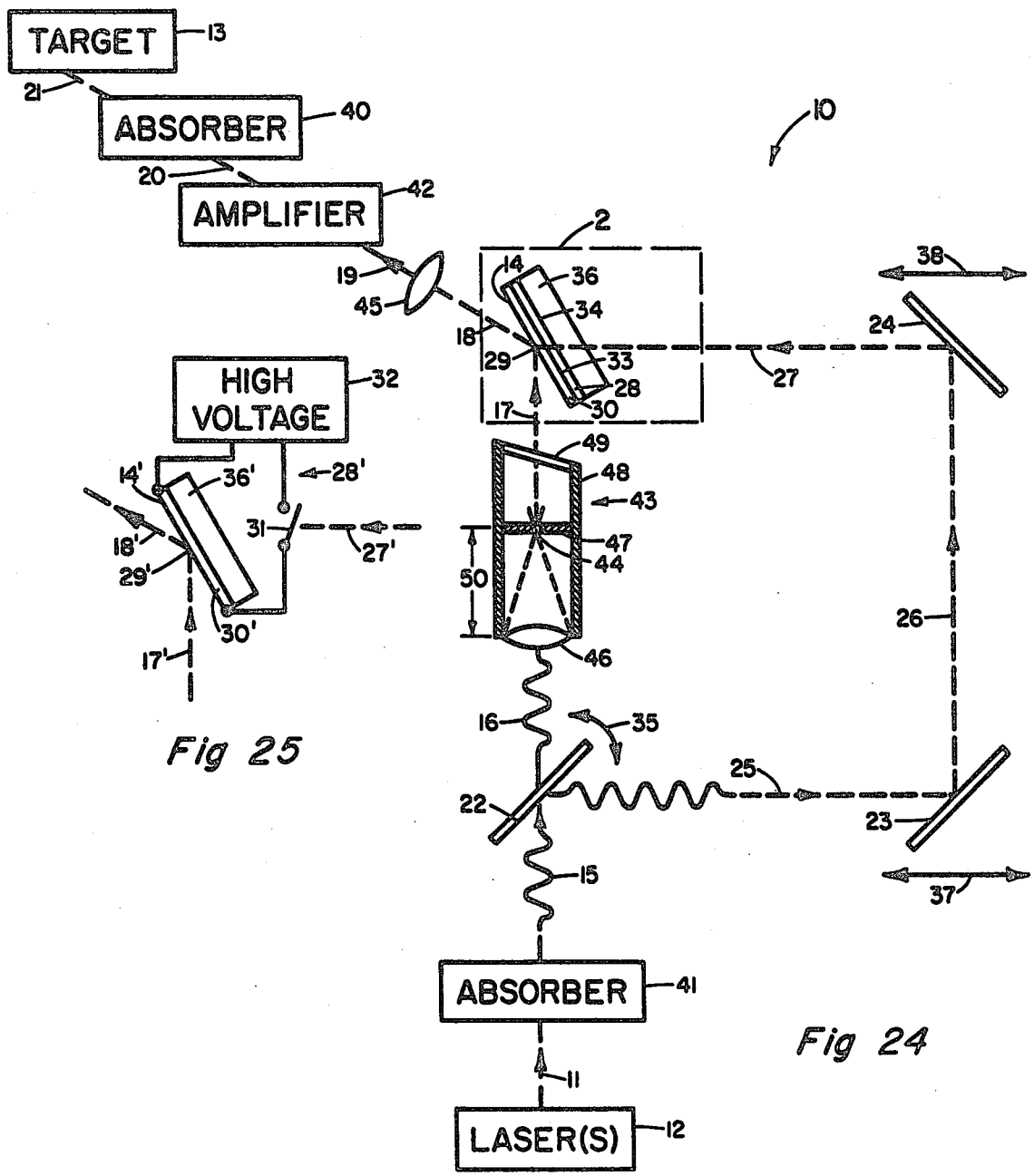

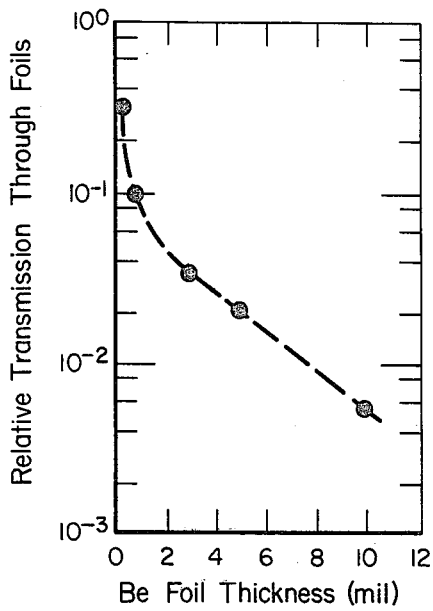
FIG. 26. X-RAY TRANSMISSION THROUGH BERYLLIUM FOILS
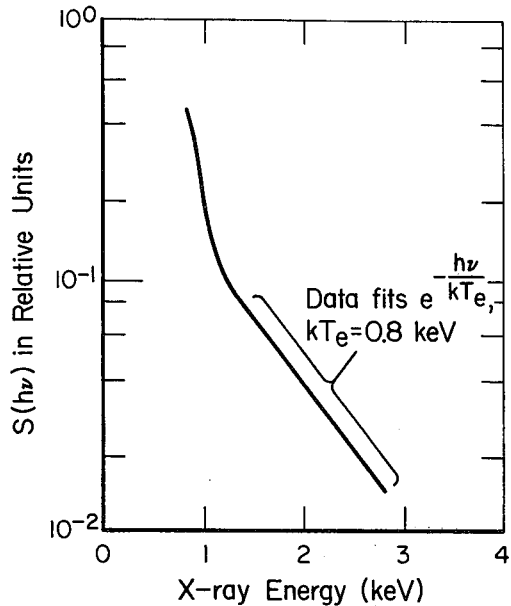
FIG. 27. X-RAY SPECTRAL DISTRIBUTION FROM IRON SLABS
Derived from X-ray transmission through Beryllium foil.
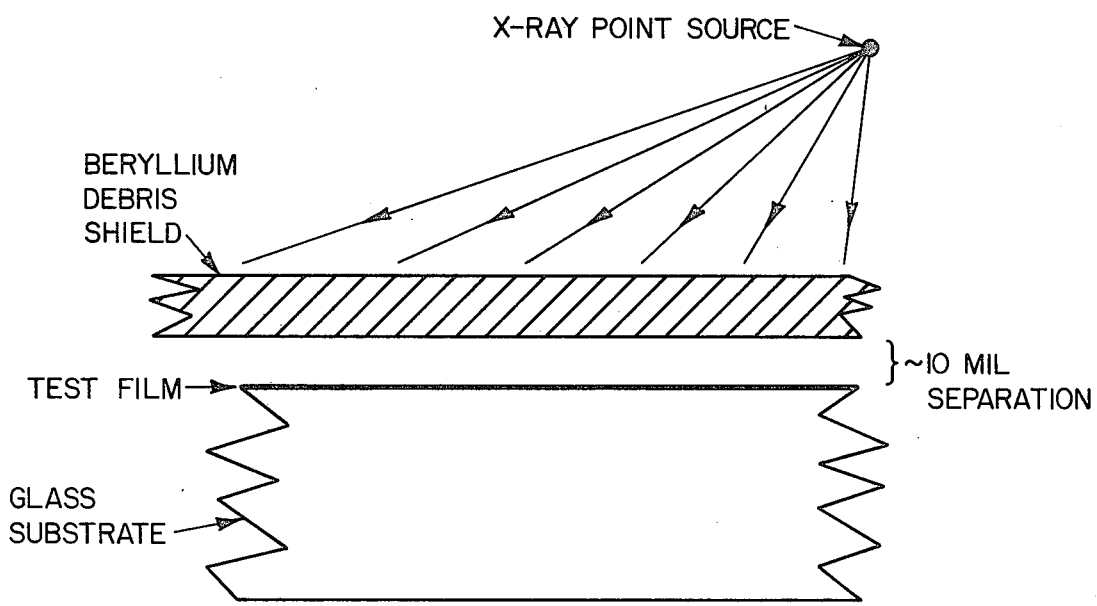
FIG. 28. MATERIAL DAMAGE THRESHOLD CALORIMETER

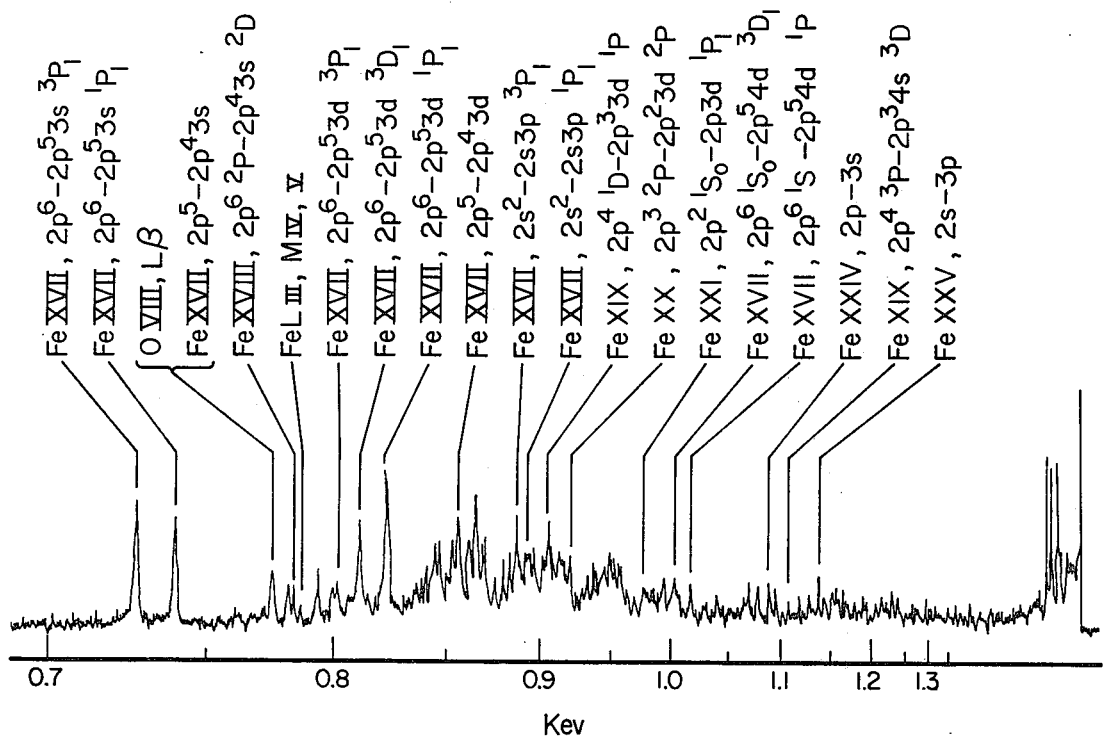

FIG. 29. SPECTROGRAPH OF X-RAYS FROM IRON SLAB TARGET USING BENT CRYSTAL SPECTROMETER

Laser flux is incident on iron slab at $\sim 10^{14}$ watts/cm$^2$.

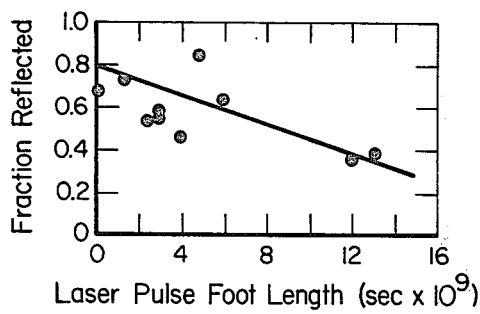

FIG. 30. LASER LIGHT REFLECTION VERSUS FOOT LENGTH

Laser flux is incident on iron slab at $\sim 10^{14}$ watts/cm$^2$.

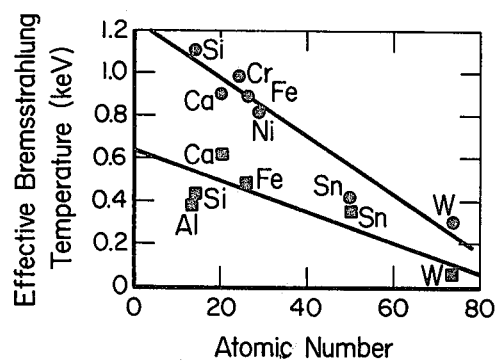

FIG. 31. EFFECTIVE BREMSSTRAHLUNG TEMPERATURE VERSUS ATOMIC NUMBER

Upper curve corresponds to $\sim 10^{14}$ watts/cm$^2$. Lower curve corresponds to $\sim 0.4 \times 10^{14}$ watts/cm$^2$.

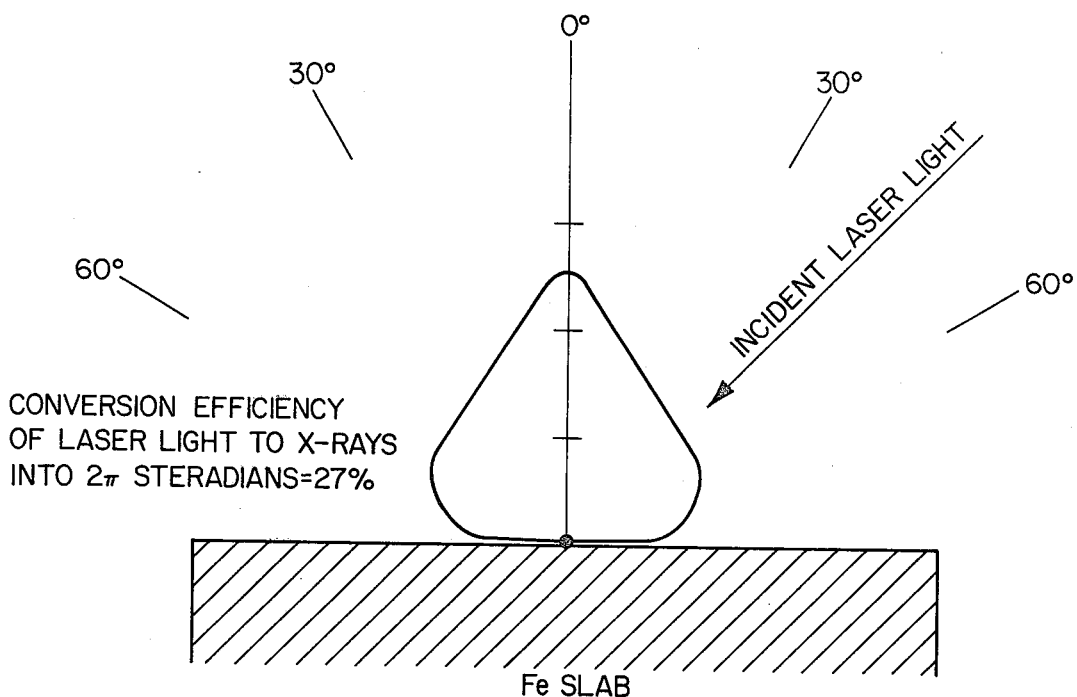
FIG. 32. X-RAY RADIATION PATTERN
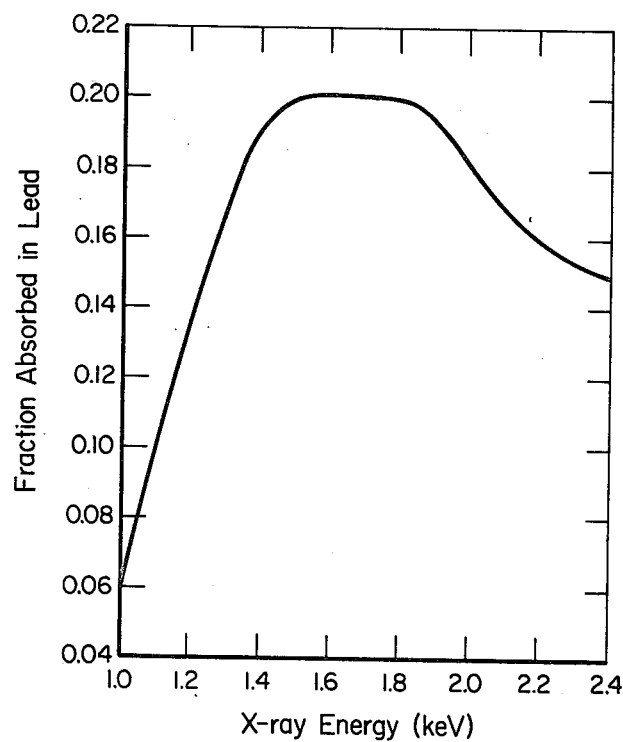
FIG. 33. FRACTION OF X-RAYS ABSORBED IN 2000 Å LEAD FILM AFTER PASSING THROUGH 1 MIL BERYLLIUM FOIL VERSUS ENERGY

PRODUCING X-RAYS

BACKGROUND

By bombarding a thick iron target with a high-power laser, a broad-band source of X-rays has been produced. The conversion efficiency of 1.06-micron laser light into X-rays is at least 10%, probably 15–20% and possibly 30–40%.

Above 1 kV the output was mainly spectral lines, and the major portion below 1 kV was probably lines, too. At energies above 1 kV, the conversion efficiency is about 5%.

The result can be a big step forward toward a brute-force X-ray laser. One possibility is to use a broad-band X-ray source of very high intensity as a laser pump.

A Hadron CGE-640 neodymium-doped glass laser is pulsed at 100 joules in 1 nanosec. The beam passes through an $f/1$ or $f/3$ lens, strikes a target at 45° with respect to the incident beam, and a plasma is produced in the target at the laser focus. The target is a 1-cm-thick slab, essentially infinitely thick to the laser. Targets of chromium, calcium, nickel, aluminum, lead, tungsten, and gold provide X-ray conversion with varying efficiencies. With chromium essentially the same efficiency is obtained as with iron.

The distribution of internal states in the atom, rather than the gross properties of the target, are what determines the output. That is, the spectrum and conversion efficiency depend on the atomic number Z of the target, and one can expect large conversion efficiencies from any material with Z above 10, provided one properly adjusts the precursor pulse or foot, a low-power pulse that precedes the main pulse. The purpose of the foot is to produce plasma so that the main pulse will strike a plasma rather than a solid.

For iron, the material used for most of the studies, with no foot one gets very soft X-rays. With a long foot one gets a few harder X-rays. With full parametric variation of foot size one gets an optimal value at 8–10 nanosec pulse duration.

Using a computer analysis to solve the rate equations resulting from a microscopic description of all the principal collisional and radiative processes in the experiment, good agreement is found between the calculation and experiment.

Experiments were made also with pellets, but most of the emphasis has been on slabs because they appear to be more useful in gaining basic data, although they may not be the best geometry. Similarly, emphasis has been on iron, although it may not be the best material.

Laser bombardment of high-Z materials appears promising for an X-ray laser, and also has other used. In fact emphasis has primarily been on other uses.

Because of the good conversion efficiency and considerable line output, it appears that by making a different selection of targets, most of the energy could be made to come out in a few lines. When one pulses a material rapidly compared to the lifetime of the states involved, one would expect to produce metastable states. If superradiant levels are present in the laser focus, the device would be close to a laser. The only problem left would be to make a cavity.

The interaction of a laser beam with high-Z materials is also useful for controlled fusion. The technique may play a key role in lowering the threshold laser energies for achieving fusion. Although most of the emphasis in this effort has been with light materials, high-Z materials could be used in conjunction with deuterium and tritium, perhaps in different layers.

An intense point source of X-rays with a high conversion efficiency of laser light into X-rays has been developed. The X-rays emanate from a spot of approximately 100 microns diameter, and a large fraction of the X-rays (sometimes 50% or more) are emitted in the form of spectral lines.

An important implication of these properties is the fact that many of the applications that are generally cited in justification of an X-ray laser can be accomplished with a point source (i.e., "spatially coherent" source) of X-ray lines, or even with a point source of broad band X-rays. For example, a significant fraction of the X-rays can be focused to another point or into a parallel beam by means of critical angle reflectors, Fresnel zone plates, or Bragg diffractors.

It is calculated that the X-ray emission in a single spectral line can exceed 1% of the indicent laser light. This can also be true when a substantial amount of amplification through stimulated emission occurs. In the latter case the device constitutes an actual X-ray laser, which can provide a narrow beam if the plasma shape is a suitably long cylinder or an X-ray cavity is constructed. Indeed, in addition to the fact that it can serve many of the functions of an X-ray laser, the point source device is only one step away from a true X-ray laser. Large outputs of X-ray lines are being produced in a highly nonequilibrium plasma, and theory says that a substantial amount of stimulated emission can occur with some adjustments of plasma temperature of target configuration.

Statements are often made that picosecond or terrawatt pumping pulses are required for an X-ray laser. This appears to be untrue. Calculations indicate that a nanosecond laser pulse with 100 to 1000 joules of energy should be more than adequate.

Another route to an X-ray laser is to use the X-rays generated by the present technique to knock out inner shell electrons from atoms in a separate laser medium and thereby create a population inversion.

SUMMARY OF THE INVENTION

A typical method of producing X-rays according to the present invention comprises directing radiant energy from a laser onto a target, and conversion efficiency of at least bout 3 percent is obtained by providing the radiant energy in a low-power precursor pulse of approximately uniform effective intensity focused onto the surface of the target for about 1 to 30 nanoseconds so as to generate an expanding unconfined coronal plasma having less than normal solid density throughout and comprising a low-density (underdense) region wherein the plasma frequency is less than the laser radiation frequency and a higher-density (overdense) region wherein the plasma frequency is greater than the laser radiation frequency and, about 1 to 30 nanoseconds after the precursor pulse strikes the target, a higher-power main pulse focused onto the plasma for about $10^{-3}$ to 30 nanoseconds and having such power density and total energy that the radiant energy is absorbed in the underdense region and conducted into the overdense region to heat it and thus to produce X-rays therefrom with the plasma remaining substantially below normal solid density and thus facilitating the substantial emission of X-rays in the form of spectral lines arising from nonequilibrium ionization states.

The target typically consists essentially of an element having a high atomic number Z, i.e., an atomic number Z greater than 10. Typically the target consists essentially of iron, calcium, chromium, nickel, aluminum, lead, tungsten, or gold.

The amplitude, duration, and shape of the precursor pulse typically are adjusted to control the intensity and spectral content of the X-rays. The precursor pulse typically comprises about 0.01 to 5 joules (about $10^{10}$ to $10^{12}$ watts per square centimeter), and strikes the target at an angle of about 20° to 70° from its surface.

The main pulse typically comprises at least about 0.1 joule, preferably about 10 to 200 joules in about 1 to 3 nanoseconds.

In a typical embodiment, the target consists essentially of iron and the duration of the precursor pulse is about 8 to 10 nanoseconds.

The electron density in the low-density region of the plasma typically is about $10^{16}$ to $10^{21}$ per cubic centimeter, and in the higher-density region about $10^{19}$ to $10^{25}$ per cubic centimeter. The radiant energy typically is focused onto a spot on the target having a diameter of about 10 to 1000 microns. The volume of the plasma typically is about $10^{-6}$ to $10^{-3}$ cubic centimeter, the thickness of the plasma in any direction being about 0.001 to 0.1 centimeter.

For low energy applications the X-rays are emitted predominantly in the form of spectral line.

The radiant energy may be focused onto a spot on the target having a diameter of about 10 to 100 microns, generating a plasma of about the same diameter, to form substantially a point source of X-rays and thus to provide substantially the advantages of stimulated emission of X-rays.

In some embodiments of the invention the composition of the target and the temperature of the plasma are selected to provide a substantial amount of stimulated emission of X-rays.

In other embodiments X-rays are directed to impinge upon a fluorescent target so as to remove inner shell electrons from atoms thereof and thereby create a population inversion.

In a typical method of providing stimulated emission of X-rays by directing radiant energy onto a target to create by means of a pumping mechanism some upper and lower laser levels, the required population inversion is not established by the pumping mechanism alone, but by the combined action of the pumping mechanism and a quenching mechanism that extinguishes the lower laser level at a rate sufficient to establish and continuously maintain the inversion. The pumping mechanism typically comprises excitation by collisions of electrons and ions or by dielectronic recombination. The quenching mechanism typically comprises Auger transitions, Coster-Kronig transitions, or collisions. The radiant energy may be from a laser, or it may comprise a beam of electrons. The pumping mechanism may comprise a beam of electrons.

In some embodiments the pumping mechanism is sufficient to create a population inversion but not to maintain it. In others the pumping mechanism is sufficient to produce X-rays but not to create a population inversion.

Where convenient, the radiant energy may be furnished as a pulse having a duration that is less than the lifetime of the upper transition state involved to produce stimulated emission of X-rays from the highly populated levels therein. The upper laser level is metastable in some cases.

For stimulated emission of X-rays, where the radiant energy comprises a pumping pulse having a duration that is longer than the lifetime of the upper state involved, overpopulation of the lower laser level may be avoided by depopulating it faster than it is populated by transitions from the upper laser level and other atomic levels, to maintain continuous wave operation during a substantial portion of the pumping pulse. Typically the lower laser level is depopulated by Auger transitions, Coster-Kronig transitions, or collisions; and the upper laser level is excited by electron-ion collisions, dielectronic recombination, three-body recombination, or photoionization. Typically a beam of X-rays is directed onto a target to remove electrons from an inner shell or subshell by photoionization, then electrons decay from an exterior shell or subshell filling the holes in the inner shell or subshell and leaving holes in the exterior shell or subshell, the holes in the exterior shell or subshell are then filled by Auger or Coster-Kronig transitions from more exterior shells or subshells, thereby eliminating the lower laser states and decreasing the population in the lower laser level. In some embodiments a beam of X-rays is directed onto a target comprising essentially a material having an atomic number Z less than about 40 to remove K-shell electrons by photoionization, then electrons decay from the L shell filling the holes in the K shell and leaving holes in the L shell, the holes in the L shell are then filled by Auger transitions from the M and N shells or Coster-Kronig transitions from other subshells of the L shell, thereby eliminating the lower laser states and decreasing the population in the lower laser level.

Laser action can be obtained where the radiant energy is focused onto a substantially rectangular spot on the target having a length at least about 10 times its width to generate a plasma substantially in the shape of an elongate cylinder that forms a source of spontaneously emitted X-rays and amplifies then by the process of stimulated emission therein predominantly in the directions of its axis. The spot typically is about 1 to 100 microns wide and about 100 to $10^5$ microns long, and the cylindrical plasma that is generated is about 1 to 1000 microns in diameter and about 100 to $10^5$ microns long.

Laser action can be provided where an amplifying cavity is positioned adjacent the plasma to receive a substantial proportion of the X-rays produced and by multiple reflections to direct the X-rays repeatedly through the cavity and the plasma to amplify them and to direct them the coherent amplified waves predominantly in a predetermined path. A typical amplifying cavity comprises a hollow guide that is substantially circular in cross section and due to reflection at or below the critical angle has a substantially completely reflective side surface. In a typical embodiment the guide comprises a pair of coaxial substantially circular cylinders of which one end of each is substantially completely reflective (as by having an appropriately arranged reflector configuration which employs critical angle or Bragg diffraction processes) and the other end is positioned adjacent to the plasma. In another the guide comprises substantially a torus having a gap therein in the shape of a thin disk substantially coaxial therewith, and the plasma is positioned in the gap.

In a method of providing a controlled nuclear fusion reaction by directing radiant energy from a laser onto a target to create a plasma, the present invention includes the improvement that comprises including in the composition of the target an element having a high atomic number Z, together with the usual deuterium, tritium, or other lower-Z material. Typically the target comprises at least one layer of high-Z material and at least one layer of lower-Z material. In a typical embodiment the high-Z material comprises essentially iron and the lower-Z material comprises essentially lithium deuteride.

BRIEF DESCRIPTION OF THE DRAWINGS

The drawings all represent features or other aspects of the present invention.

FIG. 1 is a schematic elevational view of typical apparatus for practicing the invention.

FIG. 2 is graph of a typical laser pulse with foot (precursor pulse).

FIG. 3 is a schematic sectional representation of a typical plasma and associated phenomena.

FIG. 4 is a schematic sectional view of a typical target.

FIGS. 5, 6, and 7 are graphs of typical plasma properties.

FIG. 8 is a schematic view representing radiant energy focused onto a substantially rectangular spot on a target.

FIG. 9 is a schematic view representing a substantially cylindrical plasma generated as in FIG. 8.

FIGS. 10 and 11 are schematic sectional views of typical amplifying cavities.

FIGS. 12–17 are graphs of typical properties in a nonequilibrium ionization.

FIGS. 18–23 are similar graphs for an equilibrium ionization.

FIG. 24 is a schematic view illustrating apparatus for avoiding damage to high-power lasers used in the invention.

FIG. 25 is a schematic view of an alternative form of the portion of the apparatus in the rectangle 2 in FIG. 24.

FIG. 26 is a graph of X-ray transmission through beryllium foils.

FIG. 27 is a graph of X-ray spectral distribution from iron slabs.

FIG. 28 is a schematic sectional view of a calorimeter for measuring material damage threshold, FIG. 29 is a densitometer trace of a film recording the spectrograph of X-rays from an iron slab target.

FIG. 30 is a graph of laser light reflection versus foot length for an iron slab target.

FIG. 31 is a graph of effective bremsstrahlung temperature versus atomic number.

FIG. 32 is a schematic sectional representation of a typical X-ray radiation pattern.

FIG. 33 is a graph of X-ray absorption.

The drawings of apparatus are highly magnified and simplified schematic representations and of course are not to scale.

DESCRIPTION OF PREFERRED EMBODIMENTS

Referring first to FIG. 1, a typical method of producing X-rays according to the present invention comprises directing radiant energy 60 from a lase onto a target 61, and high conversion efficiency is obtained by at least one of the following steps:

a. providing the radiant energy 60 in a low-power precursor pulse 62 (see FIG. 2) focused onto the target 61 to generate a plasma 63 (FIG. 3) and shortly thereafter a higher-power main pulse 64 (FIG. 2) focused onto the plasma 63 to heat it and thus to produce X-rays 65 therefrom;

b. focusing the radiant energy 60 onto a target 61 (FIG. 4) shaped to contain or compress the plasma 63 generated by the energy 60 so as to increase the density of the plasma 63, to increase its duration in a dense state, or both;

c. providing the radiant energy 60 in sufficient power to generate a plasma 63 having a low-density region 66 wherein the plasma frequency is less than the laser radiation frequency and a higher-density (overdense) region 67 wherein the plasma frequency is greater than the laser radiation frequency so that the radiant energy is absorbed in the low-density region (as at 68) and thermally conducted as indicated at 69 through a critical density region 70 into the higher-density region 67 where the bulk of the X-rays 65 are produced;

d. focusing the radiant energy onto a target 61 (FIG. 4) containing fusionable material 71 and material 72 capable of producing a substantial quantity of X-rays 65 so as to provide a controlled thermonuclear reaction therein and thus increase the total energy available to produce X-rays.

Typically a conversion efficiency of at least about 3 percent is obtained by providing the radiant energy in a low-power precursor pulse 62 of approximately uniform effective intensity (as in FIG. 2) focused onto the surface of the target 61 for about 1 to 30 nanoseconds so as to generate an expanding unconfined coronal plasma 63 (FIG. 3) having less than normal solid density throughout and comprising a low-density (underdense) region 66 wherein the plasma frequency is less than the laser radiation frequency and a higher-density (overdense) region 67 wherein the plasma frequency is greater than the laser radiation frequency and, about 1 to 30 nanoseconds after the precursor pulse strikes the target, a higher-power main pulse focused onto the plasma for about $10^{-3}$ to 30 nanoseconds and having such power density and total energy that the radiant energy is absorbed in the underdense region and thermally conducted as indicated at 68 into the overdense region to heat it and thus to produce X-rays 65 therefrom with the plasma 63 remaining substantially below normal solid density and thus facilitating the substantial emission of X-rays in the form of spectral lines (as in FIG. 29) arising from nonequilibrium ionization states.

The main pulse 64 typically comprises at least about 0.1 joule in about $10^{-3}$ to 30 nanoseconds, preferably about 10 to 200 joules in about 1 to 3 nanoseconds, and strikes the plasma 63 about 1 to 30 nanoseconds after the precursor pulse strikes the target.

In a typical embodiment, the target 61 consists essentially of iron and the duration of the precursor pulse 62 is about 8 to 10 nanoseconds, as in FIG. 2.

The electron density in the low-density region 66 of the plasma 63 typically is about $10^{16}$ to $10^{21}$ per cubic centimeter, and in the higher-density region 67 about $10^{19}$ to $10^{25}$ per cubic centimeter. The radiant energy 60 typically is focused onto a spot 73 on the target 62 having a diameter of about 10 to 1000 microns. The volume of the plasma 63 typically is about $10^{-6}$ to $10^{-3}$ cubic centimeter, the thickness of the plasma 63 in any direction being about 0.001 to 0.1 centimeter.

For low energy applications the X-rays 65 are emitted predominantly in the form of spectral lines, as in FIG. 29.

The radiant energy 60 may be focused onto a spot 73 on the target 61 having a diameter of about 10 to 100 microns, generating a plasma 63 of about the same diameter, to form substantially a point source of X-rays 65 and thus to provide substantially the advantages of stimulated emission of X-rays.

In some embodiments of the invention the composition of the target 62 and the temperature of the plasma 63 are selected to provide a substantial amount of stimulated emission of X-rays 65.

In other embodiments X-rays 65 are directed to impinge upon a fluorescent target so as to remove inner shell electrons from atoms thereof and thereby create a population inversion.

In a typical method of providing stimulated emission of X-rays by directing radiant energy onto a target to create by means of a pumping mechanism some upper and lower laser levels, the required population inversion is not established by the pumping mechanism alone, but by the combined action of the pumping mechanism and a quenching mechanism that extinguishes the lower laser level at a rate sufficient to establish and continuously maintain the inversion. The pumping mechanism typically comprises excitation by collisions of electrons and ions or by dielectronic recombination. The quenching mechanism typically comprises Auger transitions, Coster-Krönig transitions, or collisions. The radiant energy may be from a laser, or it may comprise a beam of electrons. The pumping mechanism may comprise a beam of electrons.

In some embodiments the pumping mechanism is sufficient to create a population inversion but not to maintain it. In others the pumping mechanism is sufficient to produce X-rays but not to create a population inversion.

Where convenient, the radiant energy may be furnished as a pulse having a duration that is less than the lifetime of the upper transition state involved to produce stimulated emission of X-rays from the highly populated levels therein. The upper laser level is metastable in some cases.

For stimulated emission of X-rays, where the radiant energy comprises a pumping pulse having a duration that is longer than the lifetime of the upper state involved, overpopulation of the lower laser level may be avoided by depopulating it faster than it is populated by transitions from the upper laser level and other atomic levels, to maintain continuous wave operation during a substantial portion of the pumping pulse. Typically the lower laser level is depopulated by Auger transitions, Coster-Krönig transitions, or collisions; and the upper laser level is excited by electron-ion collisions, dielectronic recombination, three-body recombination, or photoionization. Typically a beam of X-rays is directed onto a target to remove electrons from an inner shell or subshell by photoionization, then electrons decay from an exterior shell or subshell filling the holes in the inner shell or subshell and leaving holes in the exterior shell or subshell, the holes in the exterior shell or subshell are then filled by Auger or Coster-Krönig transitions from more exterior shells or subshells, thereby eliminating the lower laser states and decreasing the population in the lower laser level. In some embodiments a beam of X-rays is directed onto a target comprising essentially a material having an atomic number Z less than about 40 to remove K-shell electrons by photoionization, then electrons decay from the L shell filling the holes in the K shell and leaving holes in the L shell, the holes in the L shell are then filled by Auger transitions from the M and N shells or Coster-Krönig transitions from other subshells of the L shell, thereby eliminating the lower laser states and decreasing the population in the lower laser level.

Laser action can be obtained where the radiant energy 60 is focused onto a substantially rectangular spot 74 on the target 61, as in FIG. 8, having a length at least about ten times its width to generate a plasma 63 substantially in the shape of an elongate cylinder 75, as in FIG. 9, that forms a source of spontaneously emitted X-rays 76 and amplifies them by the process of stimulated emission therein predominantly in the directions of its axis. The spot 74 typically is about 1 to 100 microns wide and about 100 to $10^5$ microns long, and the cylindrical plasma 75 that is generated is about 1 to 1000 microns in diameter and about 100 to $10^5$ microns long.

Laser action can be provided where an amplifying cavity such as 81 (FIG. 10) or 82 (FIG. 11) is positioned adjacent the plasma 63 to receive a substantial proportion of the X-rays produced and by multiple reflections, provided by Bragg angle or critical angle reflections, or both, as at 83, to direct the X-rays 65 repeatedly through the cavity 81 or 82 and the plasma 63 to amplify them and to direct the coherent amplified waves predominantly in a predetermined path, as indicated at 84. A typical amplifying cavity 81 or 82 comprises a hollow guide 85 (FIG. 10) or 86 (FIG. 11) that typically is substantially circular in cross section and due to reflection at or below the critical angle has a substantially completely reflective side surface 87. In a typical embodiment (FIG. 10) the guide 85 comprises a pair of coaxial substantially circular cylinders 85 of which one end 88 of each is substantially completely reflective (as by having an appropriately arranged reflector configuration which employs critical angle or Bragg diffraction processes) and the other end 89 is positioned adjacent to the plasma 63. In another typical embodiment (FIG. 11) the guide 86 comprises substantially a torus having a gap therein (at 90) in the shape of a thin disk substantially coaxial therewith, and the plasma 63 is positioned in the gap 90.

In a method of providing a controlled nuclear fusion reaction by directing radiant energy 60 from a laser onto a target 61 as in FIG. 4 to create a plasma 63, the present invention includes the improvement that comprises including in the composition of the target 61 an element 72 having a high atomic number Z, together with the usual deuterium, tritium, or other lower-Z material at 71. Typically the target 61 comprises at least one layer 72 of high-Z material and at least one layer 71 of lower-Z material. In a typical embodiment the high-Z material 72 comprises essentially iron and the lower-Z material 71 comprises essentially lithium deuteride. Other useful targets are described in Reference 10.

EXAMPLES

Theoretical and experimental studies of laser produced, high-Z radiative plasmas were conducted. A theoretical model and computer code have been developed which include the effects of index of refraction, bremsstrahlung, recombination radiation, line radiation, single fluid shock hydrodynamics, separate kinetic temperatures for electrons and ions, and electron thermal conductivity. Its validity extends to highly nonequilibrium regimes such as the "time dependent corona" regime. Computer calculations have been performed which predict that large fluxes of X-rays can be generated by placing high-Z targets in the laser focus, with efficiencies in excess of 20 percent for converting laser light into X-rays being feasible at $10^{14}$ watts/cm$^2$ of laser light incident over 1 nanosecond. The experiments were performed using 10–100 joule, 1–2 nanosecond, 1.06 micron pulses generated with Battelle's HADRON/CGE VD-640 neodymium-doped glass laser, isolated from backscattered light by a special exploding mirror surface. The X-ray yield was measured with several techniques, including scintillator detectors, material damage, micro-calorimeter, scintillator camera, and thermoluminescence detectors. Conversion efficiencies of laser light into X-rays of at least 10 percent, probably 15–20 percent, and possibly higher were obtained with iron slab targets oriented at 45° with respect to the incident beam. The X-ray yield above 1 keV is about 5 percent of the incident laser light.

I. INTRODUCTION

Progress in the development of high power lasers during the past several years has opened the door to several new areas of research. The best known, of course, is the remarkable possibility of achieving controlled thermonuclear fusion by means of laser heated plasmas.

There is a second and newer application of high power lasers, however, which from the point of view of basic laser and plasma physics is equally exciting. The new problem is to generate an intense X-ray source using lasers. The simplest approach is to place a small particle in the focus of a high power laser or array of high power lasers, and thereby heat it to such a high temperature that the energy it radiates lies in the X-ray regime.

There are many points of similarity between the X-ray problem and the fusion problem. Both, for example, involve the laser heating of plasmas to the multikilovolt regime. But there is an important difference. The fusion work is mostly directed to the heating of fusionable materials, which by nature have a low atomic number, Z. The X-ray work, on the other hand, involves the heating of high-Z materials, which are far more effective in converting laser light into X-rays.

The research reported here has conclusively demonstrated that X-rays can be generated in sufficient quantities and in an appropriate spectral range to satisfy a number of important requirements for laboratory X-rays.

In the early phase of the study, the Battelle laser-generated plasma computer code FLASH was generalized to acount for time dependent ionization, and conversion efficiencies greater than 20 percent of laser light into X-rays were calculated assuming certain initial plasma conditions. At the same time, a HADRON/CGE VD-640 laser was installed by Battelle-Columbus, and a special isolator device was developed to eliminate the troublesome problem of glass damage caused by amplification of laser light backscattered from targets.[1]

In the next phase, the total X-ray yield and effective temperature were studied with 1 nanosecond laser pulses preceded by a variety of "feet" (i.e., prepulses) ranging from approximately 1 to 15 nanoseconds. The purpose here was to identify the prepulses that would establish optimum initial plasma profiles when the laser beam was focused on particular solid targets. In addition to the foot study, tests were conducted to establish the feasibility of preventing debris from the laser generated plasma from striking X-ray irradiation samples.

The results were extremely successful. X-rays with an energy above $\sim 1$ keV were routinely delivered, behind a beryllium debris shield, at sufficiently high fluxes to vaporize lead over an area of several cm$^2$. Efficiencies of $\sim 5$ percent for converting laser light to X-rays above 1 keV were obtained. The overall conversion efficiency of laser light to X-rays that was obtained was at least 10 percent, probably 15–20 percent, and possibly 30–40 percent. Most remarkably, these results were all obtained using 1–2 nanosecond laser pulses with less than 100 joules total energy. There is no question that these conversion efficiencies, which are already satisfactory, could be increased with the use of larger laser pulses.

The plasmas most effective for X-ray production consist of high-Z materials raised to the multikilovolt regime. The dynamics of a high-Z plasma and its radiative output involve a variety of collisional and radiative processes in addition to the usual phenomena that occur in low-Z plasmas. The new processes make possible higher conversion efficiencies, but also add considerable complexity to the problem. In view of this complexity it will be valuable, before discussing the theoretical and experimental work in detail, to establish the basic story of what happens when a high intensity laser pulse strikes a high-Z target: a discussion of the basic phenomenology is provided in the next two sections, where for definiteness, 1000 joules of pulsed neodymium laser light are assumed.

II. MACROSCOPIC CHARACTERIZATION

The first problem to consider is to insure that laser light is admitted into the plasma and not reflected away at the surface. Whenever the laser frequency $\omega_L$ is less than the plasma frequency $\omega_p = (4\pi n_e e^2/m)^{1/2}$ of the target plasma, the incident light is reflected. If the reverse is true, the light will enter the plasma. The critical electron density at which the plasma frequency equals the frequency of neodymium laser light is $10^{21}$ cm$^{-3}$, so that to avoid reflection $$n_e \lesssim 10^{21} \text{ cm}^{-3} \tag{1}$$

This description of light reflection is naive and not always true, but it is a useful introductory statement of a problem that must be ultimately dealt with.

The second problem to consider is whether the laser light is absorbed by the plasma. In order to insure a high conversion efficiency of laser light into X-rays, most of the light must be absorbed rather than transmitted through the plasma. This condition imposes a lower bound on the electron density of about $10^{19}$ or $10^{20}$. Thus, there is a working range of one or two factors of ten of electron density in which the laser light enters the plasma without being reflected and is also mostly absorbed before passing through.

Now where within this working range is it most desirable to operate? The answer is provided by the objective of maximizing the X-ray yield. Since all of the processes known to contribute to X-radiation, namely bremsstrahlung, recombination radiation and line radiation, increase with the square of electron density, it is desirable to work as close as possible to the upper end of the working range. This establishes $10^{21}$ as a sort of "favorite" electron density for X-ray production.

Now what should the plasma size be? This is established by heat capacity considerations based on complete absorption of the 1000 joules of incident laser light. The characteristic volume and side length of a plasma, of electron density $10^{21}$, that lies in the multikilovolt regime with 1000 joules of absorbed energy are $$L^3 \sim .10^{-3} \text{cm}^3, \quad (2)$$

$$L \sim 10^{-1} \text{cm}. \quad (3)$$

This is a reasonable approximation for plasmas of any atomic number, Z.

It is now possible to determine what the pulse length of the laser should be. This parameter is established by the characteristic hydrodynamic expansion time of a 0.1 cm thick multikilovolt plasma, which is $\sim 10^{-9}$ seconds. The approximation is valid for plasmas of any $n_e$ and Z within a factor of 3 or so. If a pulse substantially longer than a nanosecond is used, the plasma will expand and go transparent during the irradiation, and will convert the absorbed energy into X-rays with a reduced efficiency. A shorter pulse, on the other hand, is probably acceptable, but there is usually no reason to make the problem more difficult by employing a pulse which is unnecessarily short. The appropriate pulse width of the laser is thus $$\tau_L \sim 10^{-9} \text{sec}. \quad (4)$$

What about heat conduction and temperature uniformity? Heat is conducted in the laser plasma mainly by electron thermal conductivity. This process is similar to the conductivity of an ordinary gas except that the carrier particles are electrons rather than atoms. Calculations show that electron thermal conductivity will generally render the electron temperature uniform within a nanosecond if the final electron temperature is greater than $\sim 5$ keV, but will have difficulty in doing so if the final electron temperature is only 1 or 2 keV. When the conductivity fails, other processes, such as shock heating and the tendency of the incident light to be transmitted through hot regions and absorbed in cold regions, will usually step in and establish a reasonably uniform temperature. Reradiated energy, on the other hand, is not an effective agent for temperature equalization. Most of its escapes from the plasma, except at low temperatures.

We have thus far arrived at a self consistent set of laser and macroscopic plasma parameters for maximizing X-ray production for the case of 1000 joules of neodymium laser light. But neither the numbers for their stated limitations are absolute. For example, it appears possible to heat plasmas with electron densities greater than $10^{21}$ by means of a two step process, the first step of which was pointed out by Dawson, Kaw and Green.[2] The idea is that no plasma is uniform, so that reflection of an external laser beam at the critical density point entails a two way passage of the light through an outer skin with an electron density ranging from 0 to $10^{21}$. This "underdense" portion of the plasma is often capable of absorbing most of the incident energy, which is then partly transported to the "overdense" portion of the plasma by electron thermal conductivity. Thus, the numbers obtained above are mainly logical guidelines for an initial study.

III. MICROSCOPIC CHARACTERIZATION

In any case, we are now in a position to characterize the microscopic nature of the plasma. The overriding feature in this realm is that the plasma particles are not in local thermodynamic equilibrium (LTE). One nanosecond is long enough for the electrons to equilibrate among themselves by coulomb collisions and be characterized by an electron kinetic temperature, $T_e$. Similarly, there is enough time for the ions to equilibrate among themselves at an ion kinetic temperature, $T_i$. But there is generally insufficient time for $T_e$ and $T_i$ to become equal. What usually happens is that the incident laser light is absorbed by the electrons, which rise in temperature relatively rapidly while slowly heating the ions by electron-ion collisions.

Now this in itself constitutes a breakdown of LTE. But it is a trivial aspect of its breakdown, both from an analytic point of view and from the point of view of X-ray production. This is not to say that it is unimportant. Indeed, in a fusion plasma it is of paramount importance, since the desired product—fusion energy—would be sharply supressed by a lagging ion temperature. But in the X-ray problem the desired product depends mainly on electron temperature, which is only slightly affected (in high-Z plasmas) if the ion temperature lags.

There is another aspect of the breakdown of LTE which has a far more serious effect on X-ray production. This is the question of whether or not the relative ion populations (i.e., the relative number, say, of 15, 16 and 17 times ionized tungsten) are governed by the Saha Equations, as they should be for a plasma in LTE. The importance of this question is due to the strong dependence of X-ray emission on ionization potential.

The Saha Equations may be written in the approximate form[3]

$$\frac{f_{s+1}}{f_s} = 3.0 \times 10^{39} \frac{(kT_e)^{3/2}}{n_e} \exp\left(-\frac{\chi_s}{kT_e}\right), \quad (5)$$

where $f_s$ and $f_{s+1}$ are the ion fractions that are $s$ and $s+1$ times ionized, $n_e$ is the density of free electrons, and $kT_e$ is the electron temperature: $\chi_s$ is the ionization potential of the $s$ times ionized ion. In this report, cgs units are used unless otherwise stated. In the case of a plasma which is optically thin, the ionization state described by the Saha Equations results from the competitive balance between collisional ionization by two-body electron-ion collisions, and recombination by so-called three-body recombination. The latter process is a radiationless three-body "collision" involving one ion and two electrons, in which one electron combines with the ion, while the other is scattered away with a direction and velocity which guarantees energy and momentum conservation. These processes are statistical inverse of one another (i.e., one transforms into the other under time reversal); this is to be expected, since the Saha Equations pertain to an ion distribution which is in LTE.

The Saha Equations definitely break down. This may be seen by applying the following (very approximate) rule of thumb given by McWhirter[4]:

$$n_e \lesssim 10^{16} (T_e)_{eV}^{7/2} \text{ cm}^{-3}. \quad (6)$$

The quantity $(T_e)_{eV}$ is the electron temperature expressed in electron volts. Whenever Equation (6) is satisfied, the Saha Equations break down and the ion distribution is out of equilibrium. This is generally the case in the present problem, since use of $T_e \gtrsim 1000$ eV in Equation (6) gives $n_e \lesssim 3 \times 10^{26}$, which is easily satisfied by the key electron density $10^{21}$. On a microscopic level, the state of affairs that prevails when Equation (6) is satisfied is that the relative ion populations are determined by the competitive balance between collisional ionization— the same ionization process as in the Saha regime—and two-body radiative recombination, in which a free electron recombines with an ion and the excess energy and momentum are carried off by a photon. These processes are not statistical inverses of one another: the ionization process is purely collisional, whereas the recombination process involves a photon.

Now when Equation (6) is satisfied, the ion distribution is often still in a quasi-steady, though nonequilibrium, state. The ionization equations in this case are tractable as those for equilibrium, the main difference being that the Saha Equations are replaced by another set of quasi-steady equations, generally known as "Coronal Equilibrium" equations. The exact form of these equations depends on the formulas selected for the fundamental cross-sections. The Coronal Equilibrium equations implied by the formulas given in Section IV are $$\frac{f_{s+1}}{f_s} = 3.3 \times 10^{-16} \left(\frac{1}{1+d}\right) \frac{\Delta_o(s)(kT_e)^{\frac{1}{2}}}{\chi_s^{11/4}} \exp\left(-\frac{\chi_s}{kT_e}\right), \quad (7)$$

where $\Delta_o(s)$ is the number of electrons in the outer Bohr shell ($\Delta_o=1$ hydrogenlike ion, $\Delta_o=6$ for oxygenlike ions, etc.), $d$ is a correction term, and the other quantities are defined as in Equation (5). The term "quasi-steady", as applied to Equations (5) and (7), refers to the fact that $f_s$'s at any instant are specified by the instantaneous values of $T_e$ and $n_e$.

Unfortunately, in a laser heated plasma, quasi-steady conditions do not always prevail. This may be established by a second rule of thumb, also given by McWhirter[4], which applied whenever Equation (6) is satisfied; this second rule of thumb states that quasi-steady conditions break down if the characteristic time for hydrodynamic expansion or contraction, $\tau_h$, satisfies the relation $$\tau_h \lesssim \frac{10^{12}}{n_e}. \quad (8)$$

If Equation (8) is satisfied, the plasma is in an extremely nonequilibrium state. To specify the instantaneous ionization state, it is necessary to know not only the local free electron conditions, but their entire past history as well! The only recourse in such a situation is to solve rate equations which include the principal microscopic processes that contribute to the ionization rate, and calculate the time development of the plasma from an initial state.

The ionization of a multikilovolt laser generated plasma requires the time dependent treatment. This may be seen by inserting the critical electron density $10^{21}$ in Equation (8). In the underdense plasma "skin," where $n_e < 10^{21}$, the full time dependent treatment is required, although in the overdense "core" (which can be heated by shocks and thermal conduction), a quasisteady treatment is generally valid.

IV. THEORETICAL MODEL

A theoretical model and computer code have been developed to predict the time development of a high-Z, radiative plasma interacting with a laser beam. The computer code is designated by the name FLASH, and is continually being extended and improved. The version to be discussed in this report is FLASH 3, which is one dimensional but accounts for the time dependence of ionization.

ABSORPTION AND REFLECTION

In the model for absorption and reflection of laser light, the light enters the surface of the plasma and penetrates, via the laws of geometrical optics, to the critical density point, where 100 percent reflection is assumed to occur: it then retraces its path and exits from the plasma. On the way in and on the way out it is assumed to be absorbed at the rate predicted by the Dawson and Oberman[5] microwave conductivity formula, suitably modified by the approximate index of refraction[6]

$$n = \left(1 - \frac{\omega_p^2}{\omega^2}\right)^{\frac{1}{2}}, \quad (9)$$

where $\omega_p$ is the plasma frequency. Thus, the beam intensity attenuates as $dI/dx = -\alpha I$, with the absorption coefficient given by $$\alpha = 6.2 \times 10^{-25} \frac{n_i^2 \overline{Z^*} \cdot \overline{Z^{*2}} \log \Lambda}{\omega^2 \left(1 - \frac{\omega_p^2}{\omega^2}\right)^{\frac{1}{2}} (kT_e)^{3/2}} \text{ cm}^{-1}, \quad (10)$$

where $$\omega_p^2 = 3.182 \times 10^9 \, n_i \overline{Z^*} \text{ sec}^{-2}. \quad (11)$$

The light which survives absorption during the two way passage constitutes reflection. In these formulas, $n_i$ denotes ion density, $T_e$ denotes electron temperature, and $\omega$ is the frequency of the laser light. The quantity $\overline{Z^*}$ is the mean ion effective charge, $\overline{Z^{*2}}$ is the mean square ion effective charge, and log $\Lambda$ is the so-called Coulomb logarithm, which is generally set equal to 5 or 10 throughout a given problem. The justification for this extension of microwave absorption theory to the optical regime was provided by Mallozzi and Margenau[7], who showed that the primary physical process underlying the absorption of laser light is plasmas, namely free-free absorption (inverse bremsstrahlung), is the quantum analogue of the process which underlies classical microwave absorption: the formulas for free-free absorption and microwave absorption were shown to be identical when $h\nu << kT$.

CONSTITUTIVE EQUATIONS

The laser energy which is absorbed in each zone of the plasma is converted into electron kinetic energy. Now for a plasma in LTE, the energy which the electrons absorb is immediately partitioned, in a fixed and rate independent way, among the internal degress of freedom in each zone. However, in the present plasma, the conditions in each zone must be established by solving an appropriate set of rate equations. These equations are given next, and provide a time dependent link between the total energy density $\epsilon$, the total pressure $p$, the kinetic electron and ion temperatures $T_e$ and $T_i$, and the relative ion populations $f_s$.

The relative ion populations are described by the equations $$\frac{df_o}{dt} = \overline{Z}^* n_i(-f_oS_o + f_1\alpha_1 + \overline{Z}^* n_i f_1 \beta_1)$$

$$\vdots$$

$$\frac{df_s}{dt} = \overline{Z}^* n_i(-f_sS_s - f_s\alpha_s - \overline{Z}^* n_i f_s\beta_s$$

$$+ f_{s-1}S_{s-1} + f_{s+1}\alpha_{s+1} + \overline{Z}^* n_i f_{s+1}\beta_{s+1})$$

$$\vdots$$

$$\frac{df_z}{dt} = \overline{Z}^* n_i(-f_z\alpha_z - \overline{Z}^* n_i f_z\beta_z + f_{z-1}S_{z-1}), \quad (12)$$

together with the normalization condition $$\sum_{s=0}^{z} f_s = 1, \quad (13)$$

and the definition $$\overline{Z}^* = \sum_{s=1}^{z} f_s Z_s. \quad (14)$$

The quantity
$$Z_s = 0, 1, \ldots Z, \quad (15)$$
and denotes effective ion charge. The coefficients S, $\alpha$, and $\beta$ appearing in Equations (12) account respectively for collisional ionization, radiative recombination, and three body recombination, and are given by $$S(Z_s) = 4.9 \times 10^{-24} \frac{\Delta_o(Z_s)(kT_e)^{\frac{1}{2}}}{\chi^{7/4}(Z_s,g)} \exp\left(-\frac{\chi(Z_s,g)}{kT_e}\right), \quad (16)$$

$$\alpha(Z_s) = 1.5 \times 10^{-8}(1 + d)\frac{\chi Z_s - 1,g)}{(kT_e)^{\frac{1}{2}}}, \quad (17)$$

$$\beta(Z_s) = 1.6 \times 10^{-63} \frac{\Delta_o(Z_s - 1)}{\chi^{7/4}(Z_s - 1,g)(kT_e)^{5/2}} \quad (18)$$

In these formulas, $\chi(Z_s,g)$ denotes the ground state ionization potential of an ion of effective charge $Z_s$, and $\Delta_o(Z_s)$ is the number of electrons in the outermost occupied Bohr shell. The quantity $d$ is a correction for dielectronic recombination.[8] The formulas for S and $\alpha$ are essentially those given in reference 4, except for $d$, and their use leads Equations (12) to reduce to the Coronal Equilibrium Equations (7) in the limit of low particle density and slow time variation. The formula for $\beta$ was derived from S by requiring Equations (12) to reduce to the Saha Equations (5) in the limit of *high* particle density and slow time variation. This procedure leads to a low estimate for $\beta$: The reason is that Formula (16) underestimates S at high densities, since is ignores the existence of excited states.

The ionization equations given above must be solved simultaneously with the following equations for energy and pressure:

$$\epsilon = \epsilon_e + \epsilon_i + \epsilon_I, \quad (19)$$

$$p = \tfrac{2}{3}(\epsilon_e + \epsilon_i), \quad (20)$$

$$\epsilon_e = (3/2) \overline{Z}^* n_i k T_e \quad (21)$$

$$\epsilon_i = (3/2) n_i k T_i, \quad (22)$$

$$\epsilon_I = n_i \sum_{s=o}^{Z} f_s U_s = n_i \sum_{s=1}^{Z} f_s \sum_{j=1}^{S} \chi(Z_j-1,g) + \text{Const.}, \quad (23)$$

$$\frac{d(\epsilon_e + \epsilon_I)}{dt} = -(\epsilon_e - \overline{Z}^* \epsilon_i)\frac{1}{\tau_{ei}} + \left[\frac{\Delta(\epsilon_e + \epsilon_I)}{\Delta t}\right]_{rerad}, \quad (24)$$

$$\frac{d\epsilon_i}{dt} = (\epsilon_e - \overline{Z}^* \epsilon_i)\frac{1}{\tau_{ei}}. \quad (25)$$

Equation (19) expresses the total density $\epsilon$(ergs/cm³) as a sum of the electron and ion kinetic energy densities $\epsilon_e$ and $\epsilon_i$, defined by the ideal gas formulas (21) and (22), plus the total ionization energy density $\epsilon_I$. The latter quantity is defined in Equation (23) in terms of the ground state binding energies $U_s$ per ion, and alternately, the ground state ionization potentials. The binding energies and ionization potentials can be supplied to FLASH as inputs, or calculated internally using a fundamental atomic model. Equation (20) express the pressure in terms of the total kinetic energy density, in accord with the ideal gas picture for pressure. Equation (24) gives the rate of change of $\epsilon_e + \epsilon_I$. The first term on the right side accounts for the change due to elastic electron-ion collisions: this term affects only $\epsilon_e$. The second term accounts for the change in $\epsilon_e + \epsilon_I$ due to reradiation, and equals the negative of the total radiated power per cm³: this term in general affects both $\epsilon_e$ and $\epsilon_I$. Equation (25) describes the change in $\epsilon_i$, which is attributed to elastic electron-ion collisions.

These equations all ignore the potential energy between free electrons, the effect of inelastic collisions on $\epsilon_i$, and the reabsorption of emitted radiation; they also assume that the ions are mostly found in the ground state. The quantity $\tau_{ei}$ which appears in Equations (24) and (25) is the electron-ion equipartition time, and is given by[7]

$$\tau_{ei} = 1.5 \times 10^{26}\frac{(kT_e)^{3/2}A}{n_i \overline{Z}^{*2} \log \Lambda}, \quad (26)$$

where A is the atomic mass number (A=1 for hydrogen). This formula, as well as most others in FLASH 3 pertaining to collisional processes, is restricted to situations where $T_i$ is not more than a few hundred times higher than $T_e$. Such conditions almost always apply.

CONDUCTION AND HYDRODYNAMICS

Heat conductions in FLASH 3 is accounted for by the following expression for the heat flow vector:

$$F = 1.3 \times 10^{-5}\frac{T_e^{5/2}}{\log \Lambda} \frac{\overline{Z}^*}{\overline{Z}^{*2}} \nabla T_e \frac{\text{ergs}}{\text{cm}^2\text{sec}}. \quad (27)$$

This expression arises from electron thermal conductivity. Ion thermal conductivity is ignored.

Hydrodynamic motion is predicted by the hydrodynamic equations for single fluid one-dimensional motion. The Lagrangian method is employed, with shock computations stabilized by an "artificial viscosity" term. Energy density and pressure are given by the time dependent model described earlier, modified to allow for a changing $n_i$. Two terms are added to the right side of Equation (24) to allow for heat conduction and the absorption of laser light, which affect $\epsilon_e$, but not $\epsilon_i$ or $\epsilon_I$. Heating due to compression and artificial viscosity is assigned to $\epsilon_e$ and $\epsilon_i$ (i.e., added to the right sides of Equations 24 and (25) in proportion to the instantaneous ratio of $\epsilon_e$ to $\epsilon_i$.

RERADIATION

The energy radiated by the plasma arises from three mechanisms: free-free radiation (bremsstrahlung), free-bound radiation (recombination radiation), and line radiation. FLASH 3 calculates the contribution from each process and assumes that the emitted radiation escapes from the plasma.

The free-free and free-bound radiation emitted into the spectral band $\Delta(h\nu) = h\nu_2 - h\nu_1$ is given by $$P_{ff}^{1,2} = 1.2 \times 10^{-19} n_i^2 (kT_e)^{\frac{1}{2}} \left[ \exp\left(-\frac{h\nu_1}{kT_e}\right) - \exp\left(-\frac{h\nu_2}{kT_e}\right) \right] \overline{Z^*} \cdot \overline{Z^{*2}} \frac{\text{erg}}{\text{cm}^3 \text{sec}}, \quad (28)$$

$$P_{fb}^{1,2} = 5.5 \times 10^{-9} n_i^2 \frac{\overline{Z^*}}{(kT_e)^{\frac{3}{2}}} \sum_{s=1}^{Z} \sum_{n=1}^{6} f_s \chi_{sn}^2 (Z_s - 1) \frac{[2n^2 - \Delta_n(Z_s)]}{n} \exp\left(\frac{\chi_n(Z_s - 1)}{kT_e}\right)$$

$$\times \left( \begin{array}{c} \exp \dfrac{-h\nu_1 H[h\nu_1 - \chi_n(Z_s - 1)] - \chi_n(Z_s - 1) H[\chi_n(Z_s - 1) - h\nu_1]}{kT_e} \\ -\exp \dfrac{-h\nu_1 H[h\nu_2 - \chi_n(Z_s - 1)] - \chi_n(Z_s - 1) H[\chi_n(Z_s - 1) - h\nu_2]}{kT_e} \end{array} \right) \frac{\text{erg}}{\text{cm}^3 \text{sec}}, \quad (29)$$

where $\Delta_n(Z_s)$ is the number of $n$th shell electrons, $\chi_n(Z_s - 1)$ is the ionization potential of an electron captured into that shell (the capture decreases $Z_s$ by 1), and H is the "Heaviside" step function, defined by $$H(x) = 0, x < 0,$$
$$H(x) = 1, x \geq 0. \quad (30)$$

Equations (28) and (29) are the usual formulas for free-free and free-bound radiation found in the literature[9] except that integrations over $h\nu$ have been performed, with Gaunt factors set equal to unity. The summation over $n$ in Equation (29) extends over the first six shells, which are the ones most likely to influence two-body recombination.

Line radiation is given by $$P_L = 6.4 \times \quad (31)$$

$$10^{-24} n_i^2 \frac{\overline{Z^*}}{(kT_e)^{\frac{1}{2}}} \sum_{s=0}^{Z} f_s F_s \exp\left(-\frac{\chi_r(Z_s)}{kT_e}\right) \frac{\text{ergs}}{\text{cm}^3 \text{ sec}},$$

where $\chi_r(Z_s)$ is a characteristic excitation energy for the $s$th ion species and $F_s$ is a characteristic absorption oscillator strength. Equation (31) is based on a model where each ion species emits a single spectral line of photon energy $h\nu = \chi_r(Z_s)$, which is produced when ground state ions suffer inelastic two-body collisions with electrons and the excited states subsequently decay; the plasma is assumed optically thin to the emitted radiation. This picture of line radiation is admittedly approximate and lacking in fine structure. However, when combined with the FLASH time dependent ionization model, the frequency averaged line emission is a substantial improvement over what might be calculated with either the Saha or Coronal Equilibrium ionization models. Work is underway to develop a more detailed model for line radiation, including self absorption effects.

V. SAMPLE CALCULATIONS

The purpose of this Section is to present the results of two selected FLASH 3 calculations (FIGS. 12–23 and Tables 3 and 4). The input parameters for these computers runs (1 and 2) are given in Table 1, together with the input parameters of nine additional runs, which are reported in detail in the Final Report (Volume I) cited at the end of this specification. The computer runs cover two materials, three laser power densities, two laser wavelengths, and three initial plasma profiles. The problems are all one-dimensional, with the laser beams normally incident on infinite plasma slabs at uniform initial temperatures of 8.6 electron volts and with initial ion density profiles which are linear. These profiles are given in Table 2.

The main purpose in choosing these problems as the first to be analyzed was to illustrate the effect on X-ray production of basic interaction phenomena such as conduction and time dependent ionization: thus, simple slabs were studied rather than a spread of different target geometries. Another intention was to vary crucial parameters corresponding to tuneable laboratory quantities such as laser power density and the initial plasma profile. The latter quantity is related to the ionizing prepulse which strikes a solid target before arrival of the main pulse. One might wish that more materials were run. However, iron (Z=26) and calcium (Z=20) both yield high conversion efficiencies, and the basic plasma equations promise similar behavior for higher Z targets if slight changes in initial plasma profiles are made: the main difference is that harder X-ray spectra are generally attainable with higher Z targets.

An analysis of the computer runs and a comparison with earlier work [10,11,12] will be presented in Section VII. The runs will also be employed in interpreting the experimental results which are presented there.

TABLE 1.

| | PARAMETERS FOR COMPUTER RUNS | | | | | | | | | | |
|---|---|---|---|---|---|---|---|---|---|---|---|
| | 1 | 2 | 3 | 4 | 4 | 6 | 7 | 8 | 9 | 10 | 11 |
| Material | Iron | Iron | Calcium | Calcium | Calcium | Calcium | Calcium | Calcium | Calcium | Calcium | Calcium |
| Wavelength (microns) | 1.06 | 1.06 | 1.06 | 1.06 | 1.06 | 1.06 | 1.06 | 1.06 | 1.06 | 1.06 | 10.6 |
| Laser Pulse Width (nanoseconds) | 1 | 1 | 1 | .5 | .5 | .75 | 1 | 1 | 1 | 1 | .1 |
| Laser Power Density (watts/cm$^2$) | $1.05 \times 10^{14}$ | $1.05 \times 10^{14}$ | $1.05 \times 10^{14}$ | $1.05 \times 10^{14}$ | $1.05 \times 10^{14}$ | $1.05 \times 10^{13}$ | $1.05 \times 10^{15}$ | $1.05 \times 10^{14}$ | $1.05 \times 10^{13}$ | $1.05 \times 10^{14}$ | $1.05 \times 10^{14}$ |

TABLE 1.-continued

| PARAMETERS FOR COMPUTER RUNS | | | | | | | | | | |
|---|---|---|---|---|---|---|---|---|---|---|
| 1 | 2 | 3 | 4 | 4 | 6 | 7 | 8 | 9 | 10 | 11 |
| Initial Plasma Profile | | | | | | | | | | |
| A | A | A | A | A | A | B | B | B | C | A |
| Ionization Dynamics | | | | | | | | | | |
| Time Dep. | Equil | Time Dep. | Equil | Equil | Time Dep. | Time Dep. | Time Dep. | Time Dep. | Time Dep. | Time Dep. |
| Conduction | | | | | | | | | | |
| Yes | Yes | Yes | Yes | No | Yes | Yes | Yes | Yes | Yes | Yes |

TABLE 2.

INITIAL PLASMA PROFILES FOR COMPUTER RUNS

| Plasma Profile | Slope (ions/cm³ per cm) | Thickness (cm) |
|---|---|---|
| A | $5.1 \times 10^{21}$ | 0.030 |
| B | $5.1 \times 10^{20}$ | 0.30 |
| C | $1.02 \times 10^{20}$ | 1.50 |

TABLE 3

NONEQUILIBRIUM IRON CALCULATION: TIME-DEPENDENT IONIZATION
Time integrated reradiated energies as percent of time integrated input.
Incident laser flux = $1.05 \times 10^{14}$ watts/cm²
Wavelength = 1.06 microns
Initial conditions: Plasma profile A
Computer Run 1, Figs. 12–17

| Spectral Region, keV | Free-Free, % | Free-Bound, % | Line, % | Sum Over Processes, % |
|---|---|---|---|---|
| 0.0 – 0.5 | 0.04 | 0.01 | 3.71 | 3.76 |
| 0.5 – 1.0 | 0.02 | 0.01 | 1.89 | 1.92 |
| 1.0 – 2.0 | 0.03 | 0.03 | 1.28 | 1.34 |
| 2.0 – 4.0 | 0.03 | 0.04 | 0 | 0.07 |
| 4.0 – 8.0 | 0.02 | 0.02 | 0.01 | 0.05 |
| 8.0 – 16.0 | 0.00 | 0.01 | 0 | 0.01 |
| 16.0 – 1024 | 0.00 | 0.00 | 0 | 0.00 |
| Total | 0.14 | 0.12 | 6.89 | 7.15 |

(a) Time = 135 Picoseconds

| Spectral Region, keV | Free-Free, % | Free-Bound, % | Line, % | Sum Over Processes, % |
|---|---|---|---|---|
| 0.0 – 0.5 | 0.07 | 0.01 | 3.96 | 4.04 |
| 0.5 – 1.0 | 0.05 | 0.03 | 2.30 | 2.38 |
| 1.0 – 2.0 | 0.06 | 0.06 | 2.76 | 2.88 |
| 2.0 – 4.0 | 0.06 | 0.13 | 0 | 0.19 |
| 4.0 – 8.0 | 0.03 | 0.06 | 0.12 | 0.21 |
| 8.0 – 16.0 | 0.01 | 0.01 | 0 | 0.02 |
| 16.0 – 1024 | 0.00 | 0.00 | 0 | 0.00 |
| Total | 0.28 | 0.30 | 9.14 | 9.72 |

(b) Time = 265 Picoseconds

| Spectral Region, keV | Free-Free, % | Free-Bound, % | Line, % | Sum Over Processes, % |
|---|---|---|---|---|
| 0.0 – 0.5 | 0.13 | 0.02 | 4.70 | 4.85 |
| 0.5 – 1.0 | 0.09 | 0.06 | 2.71 | 2.86 |
| 1.0 – 2.0 | 0.11 | 0.13 | 4.39 | 4.63 |
| 2.0 – 4.0 | 0.10 | 0.29 | 0 | 0.39 |
| 4.0 – 8.0 | 0.05 | 0.13 | 0.32 | 0.50 |
| 8.0 – 16.0 | 0.01 | 0.03 | 0 | 0.04 |
| 16.0 – 1024 | 0.00 | 0.00 | 0 | 0.00 |
| Total | 0.49 | 0.66 | 12.12 | 13.27 |

(c) Time = 412 Picoseconds

| Spectral Region, keV | Free-Free, % | Free-Bound, % | Line, % | Sum Over Processes, % |
|---|---|---|---|---|
| 0.0 – 0.5 | 0.19 | 0.02 | 11.00 | 11.21 |
| 0.5 – 1.0 | 0.17 | 0.06 | 2.14 | 2.37 |
| 1.0 – 2.0 | 0.15 | 0.22 | 4.33 | 4.70 |
| 2.0 – 4.0 | 0.14 | 0.50 | 0 | 0.64 |
| 4.0 – 8.0 | 0.09 | 0.20 | 0.81 | 1.10 |
| 8.0 – 16.0 | 0.03 | 0.04 | 0 | 0.07 |
| 16.0 – 1024 | 0.00 | 0.00 | 0 | 0.00 |
| Total | 0.77 | 1.04 | 18.28 | 20.09 |

(d) Time = 1000 Picoseconds

TABLE 4.

Time integrated reradiated energies as percent of time integrated input.
Incident laser flux = $1.05 \times 10^{14}$ watts/cm²
Wavelength = 1.06 microns
Initial conditions; Plasma profile A
Computer Run 2, FIGS. 18 – 23

| Spectral Region, keV | Free-Free, % | Free-Bound, % | Line, % | Sum Over Processes, % |
|---|---|---|---|---|
| 0.0 – 0.5 | 0.04 | 0.01 | 0.37 | 0.42 |

TABLE 4.-continued

Time integrated reradiated energies as percent of time integrated input.
Incident laser flux = $1.05 \times 10^{14}$ watts/cm²
Wavelength = 1.06 microns
Initial conditions; Plasma profile A
Computer Run 2, FIGS. 18 – 23

| Spectral Region, keV | Free-Free, % | Free-Bound, % | Line, % | Sum Over Processes, % |
|---|---|---|---|---|
| 0.5 – 1.0 | 0.02 | 0.02 | 0.01 | 0.05 |
| 1.0 – 2.0 | 0.03 | 0.05 | 0.00 | 0.08 |
| 2.0 – 4.0 | 0.03 | 0.16 | 0 | 0.19 |
| 4.0 – 8.0 | 0.02 | 0.05 | 0.00 | 0.07 |
| 8.0 – 16.0 | 0.00 | 0.59 | 0 | 0.59 |
| 16.0 – 1024 | 0.00 | 0.02 | 0 | 0.02 |
| Total | 0.14 | 0.90 | 0.38 | 1.42 |

(a) Time = 137 Picoseconds

| Spectral Region, keV | Free-Free, % | Free-Bound, % | Line, % | Sum Over Processes, % |
|---|---|---|---|---|
| 0.0 – 0.5 | 0.09 | 0.02 | 0.77 | 0.88 |
| 0.5 – 1.0 | 0.06 | 0.05 | 0.01 | 0.12 |
| 1.0 – 2.0 | 0.07 | 0.12 | 0.01 | 0.20 |
| 2.0 – 4.0 | 0.06 | 0.41 | 0 | 0.47 |
| 4.0 – 8.0 | 0.03 | 0.15 | 0.00 | 0.18 |
| 8.0 – 16.0 | 0.00 | 1.43 | 0 | 1.43 |
| 16.0 – 1024 | 0.00 | 0.04 | 0 | 0.04 |
| Total | 0.31 | 2.22 | 0.79 | 3.32 |

(b) Time = 277 Picoseconds

| Spectral Region, keV | Free-Free, % | Free-Bound, % | Line, % | Sum Over Processes, % |
|---|---|---|---|---|
| 0.0 – 0.5 | 0.18 | 0.04 | 1.23 | 1.45 |
| 0.5 – 1.0 | 0.11 | 0.12 | 0.03 | 0.26 |
| 1.0 – 2.0 | 0.13 | 0.25 | 0.03 | 0.41 |
| 2.0 – 4.0 | 0.11 | 0.80 | 0 | 0.91 |
| 4.0 – 8.0 | 0.05 | 0.26 | 0.01 | 0.32 |
| 8.0 – 16.0 | 0.01 | 2.51 | 0 | 2.52 |
| 16.0 – 1024 | 0.00 | 0.07 | 0 | 0.07 |
| Total | 0.59 | 4.05 | 1.30 | 5.94 |

(c) Time = 428 Picoseconds

| Spectral Region, keV | Free-Free, % | Free-Bound, % | Line, % | Sum Over Processes, % |
|---|---|---|---|---|
| 0.1 – 0.5 | 0.31 | 0.07 | 1.00 | 1.38 |
| 0.5 – 1.0 | 0.17 | 0.26 | 0.11 | 0.54 |
| 1.0 – 2.0 | 0.20 | 0.48 | 0.15 | 0.83 |
| 2.0 – 4.0 | 0.17 | 1.44 | 0 | 1.61 |
| 4.0 – 8.0 | 0.10 | 0.39 | 0.00 | 0.49 |
| 8.0 – 16.0 | 0.03 | 3.44 | 0 | 3.47 |
| 16.0 – 1024 | 0.00 | 0.17 | 0 | 0.17 |
| Total | 0.98 | 6.25 | 1.26 | 8.49 |

(d) Time = 1000 Picoseconds

VI. DESCRIPTION OF EXPERIMENTS

The Laser

The experiments were performed with 1.06μ wavelength laser pulses generated with Battelle's HADRON/CGE VD-640 neodymium-doped glass laser. This instrument consists of a Q-switched oscillator followed by six amplifying stages. The final stage contains a 64 mm diameter rod. The capability of the laser ranges from 100 joules in 30 ns. This range of outputs is achieved by generating a standard 4 joule, 30 ns pulse with the oscillator and passing it through a "pulse clipper," which is located between the oscillator and the first amplifying stage. The pulse clipper consists of a laser triggered spark gap which switches a Pockels cell on for 1–2 ns near the peak of the 30 ns pulse. The width of the clipped pulse is essentially maintained as it passes through the amplifiers.

Laser Modifications

The first experiments were frustrated by the problem of damage to laser rods caused by laser light backscattered from the target. This problem was well known from laser generated thermonuclear fusion work, and had forced many experiments to be performed at power levels far below the capability of the available laser systems. [13] In the VD-640 laser operating in the 100 joule/1 nanosecond mode, glass damage will occur if as little as 1/100 joule is reflected back along the optical path by the target. The 1/100 joule pulse, although distributed over approximately 30 $cm^2$ of glass when it reenters the last amplifier, will converge and be amplified as it retraces the optical path, and at some point will exceed the 10 $joule/cm^2$ damage threshold as it funnels through smaller and smaller rods. There are certain combinations of pulses and targets for which the backscattered light is acceptably low, but this does not solve the problem. A malfunction in equipment might still deliver a dangerous pulse, and in any case it is undersirable to be limited in the experiments that can be performed.

It would appear that the laser could be protected most simply by introducing an electro-optical shutter after the last stage. The shutter would transmit the forward pulse but be switched off before the return of the back-scattered pulse. Unfortunately, the construction of Kerr or Pockels cells large enough to handle large diameter beams is very difficult and expensive. In a somewhat more attractive scheme a large multipass Faraday rotator and polarizers are used.[14] But even Faraday rotators have drawbacks for large lasers, owing to the difficulty of establishing the large volume, strong, uniform magnetic fields which are required.

To avoid these difficulties, a new method for isolating Q-switched lasers was developed. [1] The technique is readily applicable to Q-switched lasers of any aperture, power and pulse width.

Referring now to FIG. 24, a key element is a special mirror 14 designed to be highly reflecting to light incident from the front 17 and to be destroyed by light incident from the back 27. The mirror coating 14 consists of high reflectivity copper 30 deposited over high absorptivity germanium 28.

An incident pulse 15 strikes a beamsplitter 22, which transmits most of the pulse 16, 17 to the copper mirror 14 and reflects a portion 25 through the long leg 25, 26, 27 to the mirror backside. The path length of the back leg is sufficiently long that the main pulse 17 completely reflects off the front of the special mirror 14 before the small rerouted portion 27 strikes it from the back. The small pulse 27 blows the mirror film 30 off the glass plate 36, and the light scattered back along the optical path strikes a cloud of mirror coating debris.

A laser isolator based on these principles has been designed and installed between the last two stages of the Battelle laser. The device includes a precautionary feature 43, in which two lenses (46 schematically) are inserted between the beamsplitter 22 and the special mirror 14 for the purpose of focusing the beam through a small iris 47 and recollimating it. The iris 47 is enclosed in a vacuum to suppress attenuation from air breakdown, and serves the function of limiting the solid angle of acceptance of light which may be diffusely scattered into the return path by the debris cloud. In all tests conducted thus far, light backscattered by the target was attenuated by a minimum of 99 percent in passing through the isolator. The 2 or 3 db attenuation in the forward direction is easily recovered by increasing the amplification of the final stage. One drawback of this system is that a laser pulse entering the isolator at a level which is unexpected low by a factor of four or more will yield insufficient energy in the back leg to blow off the mirror. But the laser is not likely to suffer reflection damage at these lower pulse levels. In any case, additional mirror development is expected to substantially improve the low pulse limit for mirror blowoff, and the problem can be eliminated altogether by inserting a supplemental nonlinear absorber 40 to protect against the weaker backscattered pulses, or else at a scarifice of damage to the mirror blank, by vaporizing the mirror using an electrical discharge as in FIG. 25. In the present system the mirror blanks are undamaged and can be recoated at reasonable cost.

The device described above is actually a highly versatile instrument which is capable of simultaneously serving many functions besides isolation. These include beam homogenization, superradiance suppression, and divergence sharpening.

The special mirror 14, for example, serves a secondary function of suppressing hot spots in the laser beam. This is accomplished by placing the front surface of the mirror at a position where the average flux approaches the damage threshold of the reflective coating. The hot spots will exceed the damage threshold and be reduced in energy, which promotes a more homogeneous beam and helps protect downstream laser rods from hot spot damage. The same effect affords protection from accidently large pulses.

The lens-iris-lens combination 43 can be used to limit the beam divergence, and do it in such a way that it actually provides some isolation by itself and suppresses amplified spontaneous emission as well. Light backscattered from the main pulse by the plasma will be relatively diffuse and be stopped in large part by an iris 47 designed to barely accomodate the normal divergence. Amplified spontaneous emission also has a relatively high divergence and will be sharply reduced in passing through the iris 47. Use of the iris in the indicated way can replace procedures based on separating the laser amplifiers by long distances from one another and from the target.

The varied uses for the isolator components suggests that its placement at a number of strategic points in an amplifier chain can alleviate many of the problems of multistage high gain systems. As a byproduct, the lens-iris-lens combination 43 can serve as a beam expander and collimater to step up the beam diameter between stages. Use of collimated beams in the laser rods can reduce the degradation of beam divergence by pump induced inhomogeneities.

Further details of the laser modifications discussed above are included in the U.S. Patent application of Philip J. Mallozzi, Harold M. Epstein, Craig T. Walters, David C. Applebaum, and William T. Gallagher for Backscatter Isolation, Ser. No. 246,161, filed Apr. 21, 1972, now U.S. PAT. No. 3,778,585, issued Dec. 11, 1973.

One of the objectives of the present study was to assess the feasibility and cost of building a large parallel rod multistage laser for X-ray production. The study showed that problems such as isolation and amplified spontaneous emission can be solved at a reasonable cost, and that the critical factor in the overall cost is the output energy that can be delivered from each final stage in 1-2 ns pulses. As part of the evaluation of the output per stage, two 100 joule, 1-2 nanosecond pulses were delivered through the last stage of the Battelle laser, with the pulses spaced sufficiently in time to prevent glass damage. This doubled the usual short pulse capability of the Battelle laser, since the pulses were emitted along separate optical paths. This permits them to be simultaneously delivered to targets after appropriate time delays.

X-Ray Production

Once the isolation problem was solved, laser pulses with energies ranging from $\sim 10$ to 100 joules and a pulse width of $\sim 11\frac{1}{2}$ nanosecond were focused down on a variety of targets, including spheres, slabs, and wires, and the emitted X-rays were observed. The basic experimental configuration is outlined in FIG. 1, which shows the case of a thick slab irradiated at a 45° angle of incidence. The focal length of the lens is 7 cm, and it focuses the beam down to a spot size of $\sim 100$ to 200 microns diameter. Allowing for the $\sim 15$ percent energy loss suffered in passing through a lens and chamber window, this corresponds to a range of power density centering on $10^{14}$ watts/cm$^2$. The same range was employed in the computer calculations.

This program has concentrated on slab targets, in spite of the fact that the best results can probably be achieved with special target designs. [10] This approach was useful in gaining basic data. It also proved that even simple targets can yield high conversion efficiencies, at least for the case of soft X-rays.

The first experiments, performed with infinitely thick slabs, produced a tiny flux of X-rays on the second shot. But, when slabs thought to be optimally thick were used, no X-rays were detected. The reason for this mysterious behavior was that several tenths or hundredths of a joule of amplified spontaneous emission was being delivered to the target over an $\sim 10^{-4}$ second interval before the arrival of the main pulse. This amount of energy is sufficient to vaporize a parcel of matter designed to reach multikilovolt temperatures with the 100 joule main pulse, and $10^{-4}$ seconds is sufficient time for the vapor to essentially disappear.

Recognizing this effect, the experiments in this study were designed for thick slabs and many of the optimizing effects associated with using a variety of think targets were simulated with prepulses. The prepulses or "feet" that were tried ranged in pulsewidth from 1 to 20 ns, and struck the surface at power densities of about $10^{11}$ watts/cm$^2$. The function of the foot is to produce a plasma so that the main pulse strikes a plasma rather than the solid. The thickness and density profile of the initial plasma can to a large extent be controlled by tuning the foot parameters. A typical combination of foot and main pulse is shown in FIG. 2.

X-Ray Diagnostics

The characteristics of the emitted X-rays were measured by several diagnostic methods, including differential absorption foil techniques, thin film and thinister resistance calorimeters, material damage threshold calorimeters, a bent crystal X-ray spectrometer, calibrated scintillation detectors, thermoluminescence detectors, and X-ray pinhole cameras. The purpose was to assess the yield and time integrated spectrum and to provide information for comparisons with the models.

Differential Foils

In the studies made with differential foils, the X-ray power was usually monitored by two scintillation detectors placed at angles nearly perpendicular to the target face (c.f. FIG. 1). In addition, the laser power and foot power were simultaneously recorded for each shot. Various thicknesses of beryllium, carbon, and aluminum foils were placed in front of the scintillators to block the reflected laser light and to serve as differential X-ray absorption foils. The ratio of X-ray transmission through foils of two different thicknesses was reduced to a "bremsstrahlung temperature" by the technique developed by Jahoda, et. al., [15] and was indentified with the plasma electron temperature.

Now this technique is strictly applicable only to a spectrum consisting of bremsstrahlung and the high frequency tail of the free-bound continuum. But when proper care is exercised in interpreting the results, the technique is also valid in situations such as the present one, where line emission is important.

The relative transmission through several thicknesses of beryllium of the X-rays emitted from an iron slab target with $\sim 40$ joules incident on $10^{-4}$ cm$^2$ is shown in FIG. 26. A low resolution spectrum derived from the transmission curve has the shape of a plasma bremsstrahlung distribution curve with KT $\sim 0.8$ keV, except in the strong line regime below 1.25 keV (FIG. 27). This indicates that consistent results can be obtained with two foil temperature measurements when care is exercised in selecting foils of the proper thickness. A derivation of the spectral distribution function $S(h\nu)$ and the range of thicknesses over which the Jahoda temperature will be relatively independent of the choice of foils is given next.

The absorption cross section $\rho\mu$ of beryllium may be approximated by $$\rho\mu(h\nu) = 980(h\nu)^{-3} \text{cm}^{-1}, \tag{32}$$

where $h\nu$ is the photon energy in keV. The energy detected behind a thickness $x$ of beryllium is thus $$E(x) = \int_0^\infty S(h\nu) \exp[-\rho\mu(h\nu)x]d(h\nu)$$

$$= \int_0^\infty S(h\nu) \exp[-980(h\nu)^{-3}x]d(h\nu), \tag{33}$$

from which we derive $$\frac{dE(x)}{dx} =$$

$$-\int_0^\infty \frac{S(h\nu)}{x} \{980(h\nu)^{-3}x \exp(-980(h\nu)^{-3}x)\}d(h\nu). \tag{34}$$

Now for each foil of thickness $x$ there corresponds a photon energy $h\nu_x$ determined by $$980(h\nu_x)^{-3}x = 1. \tag{35}$$

The quantity in the curly brackets has a rather sharp maximum at that energy, so that $$\frac{dE(x)}{dx} \approx -\frac{a}{x} S(h\nu_x), \quad (36)$$

which may be written $$S(h\nu_x) \approx -\frac{1}{a} \frac{dE(x)}{dx} x. \quad (37)$$

This equation provides the basis for deriving FIG. 27 from FIG. 26 and establishes that the range of foil thicknesses corresponding to the plasma bremsstrahlung shaped portion of FIG. 27 ($1.3 < h\nu < 3$ keV) is $\sim 1$ to 10 mils. Consistent two foil temperatures can be obtained with foils in this range. However, extrapolations of the bremsstrahlung curve to determine total conversion efficiencies are unreliable and were not used here.

Bent Crystal X-Ray Spectra

The spectral lines were measured with a bent crystal X-ray diffraction spectrometer. A bent KAP crystal with a 3 inch radius was positioned at about 35 cm from the X-ray source. The X-rays were diffracted from the convex face of the crystal onto a strip of Kodak NS 2T film with a 3.5 inch radius of curvature. The spectrometer chamber was optically isolated from the target chamber by a 3000 A paraline window coated with 1000 A of aluminum on each side.

Calorimetry. Three calorimetric techniques were employed in this study: thermoluminescence detectors (TLD's), material damage threshold calorimeters, and nickel resistance thermometers.

The TLD's were tried first, but were completely saturated at reasonable distances by the high intensity of soft X-rays. This problem was eliminated by placing large thicknesses of absorber over the TLD's, and with 10 mils of beryllium the TLD's agreed within a factor of two with results obtained from calibrated scintillators. This corroborated the hard X-ray results. But it rendered the method useless for soft X-rays, which were the main component of the output.

A technique which proved more useful was the Material Damage Threshold Calorimeter shown in FIG. 28. This new technique, which relates X-ray fluence to vaporization of a thin lead film, was developed for the special purpose of providing lower bound conversion efficiencies for nanosecond pulses of soft X-rays. A frequently employed configuration consists of a 2000 A lead film deposited on a glass substrate and placed behind a 1 mil beryllium debris shield. The effect of thermal radiation from the beryllium shield has been shown to be negligible. A 2000 A lead thickness was preferred because it absorbed a reasonable fraction of the X-rays and was sufficiently thin to thermally equilibrate in a nanosecond. Laser irradiations of this film with 1-2 ns pulses showed that complete film removal occurs only when the absorbed laser fluence is sufficient to vaporize the entire thickness of lead. The threshold amount of absorbed X-ray energy required to vaporize the lead will essentially be the same, since the thermal equilibration time is less than the pulse width.

VII. ANALYSIS OF RESULTS

The purpose of this section is to analyze and compare the results of the computer calculations and the experiments.

The experiments were performed for a range of incident power densities from $10^{13}$ to $\sim 2 \times 10^4$ watts/cm$^2$ and for a variety of elements, including iron and calcium. The computer calculations were performed for the same range of power densities, and also covered iron and calcium.

The input conditions in the computer calculations differed in a few respects from those actually employed in the experiments. The experiments were mostly performed with a peaked pulse focused at 45° incidence to a finite spot on a slab, whereas the calculations dealt with a square wave pulse covering an infinite plane at normal incidence. But these differences turn out to be immaterial for most of cases studied.

The key to relating theory with experiment lies in the foot. When the role of the foot is included, the two methods of study fall into basic agreement, both in the overall prediction of conversion efficiencies and in the point by point description of how these efficiencies come about. An approximate model for the plasma created by the foot is given in the Appendix. The model assumes that the plasma is optically thick to laser radiation and to its own radiation, in contrast to its behavior during the main pulse. It is intended for high-Z slabs which are irradiated by neodymium laser light at an intensity of $I_f = I_{foot}$ of $\sim 10^9$ to $10^{13}$ watts/cm$^2$, with pulse widths ranging from approximately 1 to 20 nanoseconds or more.

The model given in the Appendix for the foot plasma has been used to compute the average ion density $(n_i)_{av}$, the temperature T, and the thickness $d$ of the initial plasma profile for iron as a function of the intensity $I_f$ and pulsewidth $\tau_f$ of the foot. The results are given in FIGS. 5 and 6. Now the computed thicknesses of most of the initial plasmas generated in the experiments are somewhat greater than the $\sim 0.01$ to 0.02 cm focal spot diameter. This and other geometrical aspects of the experiments can be dealth with in an approximate way by assigning a linear density gradient, or slope, to each of the initial plasmas. A reasonable first estimate is to assign an ion density slope of $(n_i)_{av}/d$ to the plasma with $(n_i)_{av}$ taken from FIG. 5 and $d$ taken from FIG. 6. Slopes calculated on this basis are given in FIG. 7.

A large number of experiments were performed with iron at an incident power density of $\sim 10^{14}$ watts/cm$^2$ for the main pulse. The foot employed in most of these experiments was $\sim 10^{11}$ watts/cm$^2$ over $\sim 10$ nanoseconds. The corresponding parameters for the initial plasma profile are found from FIGS. 5-7.

$$N_i \sim 4 \times 10^{18} \text{ions/cm}^2 \quad (1\text{-a})$$

$$(n_i)_{av} \sim 1.5 \times 10^{20} \text{ions/cm}^3 \quad (1\text{-b})$$

$$\text{Slope} \sim 6 \times 10^{21} \text{ions/cm}^3 \text{ per cm} \quad (1\text{-c})$$

$$d \sim 0.025 \text{ cm} \quad (1\text{-d})$$

The calculated value of $N_i$ implies that $\sim 10^{15}$ ions are located in the focal volume and heated by the main pulse. This quantity of matter will be raised to an electron temperature of $\sim 5$ keV upon absorbing a 100 joule main pulse, so that the foot is well "tuned" with respect to "selecting" an initial plasma with an optimum heat capacity. The calculated value of $(n_i)_{av}$ implies that the average electron density will start at $\sim 10^{21}$, and then approach several times $10^{21}$ as heating by the main pulse causes additional ionization. Although the laser light is absorbed in the underdense region, higher electron densities are achieved by conduction past the critical density point. Finally, the calculated slope and plasma thickness are essentially the same as in the computer calculations presented in Section V and designated by "Plasma Profile A." This is all in accordance with the macroscopic design principles discussed in Section II.

With regard to the calculations for the main pulse, the first computer run in Section V predicts that most of the X-rays are emitted in the form of spectral lines, and that the conversion efficiency of laser light into X-rays is at least 20 percent. This computation uses plasma profile A and an incident power density of $10^{14}$ watts/cm$^2$, chosen to correspond to the foot and main pulse of the principle experiments. The prediction that reradiation is predominantly spectral lines is attributed to the time dependent model for ionization. In this model the average degree of ionization, and hence the average energy $h\nu = \chi_r$ of the available line transitions, substantially lags the electron temperature $kT_e$ during the heating process. The average value of $\chi_r/kT_e$ is therefore much lower than the one predicted by the Saha Equation. This raises the power of line radiation, but lowers its average frequency. The second computer run presented in Section V is a "control" run which is performed with the same input conditions as the first, except for the unphysical assumption that the ion populations are predicted by the Saha Equations. Calculations of X-ray conversion efficiencies based on this type of model have recently appeared elsewhere, but these results can be highly misleading, as seen from FIGS. 18–23 and Table 4. In spite of the fact that relatively high conversion efficiencies are predicted, most of the radiation is erroneously calculated to be free-bound radiation, and furthermore, the average photon energy is too high by a factor of 10. It is noteworthy that all of the computer runs, except the unphysical ones designated "Equilibrium Calculation," predict that most of the radiation is in the form of spectral lines. It should be mentioned that this point that in the bent crystal spectrometer measurements made with the Lockheed Group, the radiation appears to be mostly lines in the spectral interval studied ($\sim$0.7 to 1.3 keV). A typical spectrum is shown in FIG. 29, which was taken at a crystal angle of 20° and a viewing angle normal to the target.

The high conversion efficiencies predicted in the computer calculations at $10^{14}$ watts/cm$^2$ were largely due to energy conducted past the critical density point. The underdense region becomes heated to several kilovolts, but the bulk of the radiation is produced by spectral lines emanating from the relatively cool ($\lesssim 1$ keV) leading edge of the thermal diffusion front. It is gratifying that this description was supported by the experiments. The high energy X-rays emitted from the hot, less dense, outer region of the plasma were observed through thick layers of absorber. This high temperature component is consistent with a conversion of $\sim 1$ percent of the incident laser energy to free-free and free-bound radiation with an electron temperature of $\sim 5$ keV. It is unnecessary to invoke plasma instabilities to account for it. The cold regime was analyzed by transmission measurements through thin foils of carbon and beryllium. A typical spectral envelope of this regime, which was obtained by unfolding the beryllium transmission curve (FIG. 26), is shown in FIG. 27. A key feature of this spectrum is the sharp increase in X-ray intensity as the frequency decreases to the regime where L-lines are predicted. The slope of the upper part of the curve indicates an electron temperature of less than 1 keV in the region where the lines are predicted.

Another significant feature of the experiments is the change in reflection which occurred when the foot was varied. FIG. 30 shows that most of the light is reflected for feet which are 1 to 2 nanoseconds long, and that the reflection drops to less than 50 percent for foot lengths much greater than 10 nanoseconds. The decrease in reflectivity was accompanied by an increase in the observed temperature. Now it is tempting to attribute the temperature increase to the simple fact that a decrease in reflectivity implies a greater power delivered to the plasma. This is undoubtedly part of the explanation, but the computer calculations refute this as the major cause. The computer runs were performed with initial conditions corresponding to a large range of foot lengths, and predict the same reflection and temperature trends as were observed. But they also imply the existence of a critically short foot. The plasma in that case behaves much like the foot plasma described in the Appendix (essentially blackbody). It now becomes clear how the often invoked blackbody temperature limitation for laser generated plasmas ($\sim$180 eV at $10^{14}$ watts/cm$^2$) is circumvented by a sufficiently long foot. This explanation is also valuable in interpreting the decrease in temperature with atomic number shown in FIG. 31, where all of the shots were made with a foot which gave good conversion efficiencies for iron. Scaling considerations based on the FLASH formulas and the foot formulas given in the Appendix predict that a foot which leads to a 20 percent conversion efficiency for iron will approach a blackbody response for the main pulse at higher-Z. This insight provides a clue for obtaining high conversion efficiencies above 1 keV with the heavier elements. A satisfactory procedure might be to use a longer and less powerful foot. The end result would probably be a higher energy spectrum than obtained from iron, but with comparable conversion efficiencies.

We now turn to the question of optical thickness. The FLASH radiation model assumes that the plasma is optically thin to its own radiation. Transmission measurements through 1 mil of beryllium show that the X-rays above $\sim$1 keV are most intense in the direction normal to the target (90°), and drop off by up to a factor of two in intensity at 0°. This demonstrates the existence of a noticeable but not troublesome self absorption effect above $\sim$1 keV. The plasma probably cannot be considered optically thin much below 1 keV, so that the model should probably be modified there to include self absorption.

The key test of the overall understanding is to verify the high conversion efficiencies which are predicted. This has been done in several ways. One method was the material damage threshold calorimeter technique illustrated in FIG. 28, which established lower bounds for the X-ray yield and provided a permanent record of the X-ray damage. In a typical verification shot for conversion efficiency, a 22 joule laser pulse struck an iron slab in the usual experimental configuration (FIG. 1). A material damage threshold calorimeter with a 1 mil beryllium foil and a 2000 Å lead film was placed 0.43 cm from the plasma at a viewing angle of 0°. The lead was vaporized down to the substrate. Since the density and total energy of vaporization of lead are 11 gm/cm$^3$ and 1200 joules/gm, the X-ray fluence absorbed by the lead at that point was 0.26 joules/cm$^2$.

Now the lead absorbs only a minor fraction of the incident fluence. The rest is stopped by the beryllium or passes through both the beryllium and the lead. A plot of the fraction absorbed in lead versus photon energy is given in FIG. 33, and shows that any spectrum of X-rays in the several keV range or lower will at most be 20.2 percent absorbed in the lead. The lower bound fluence emitted at 0° is thus 0.26/0.202 = 1.29 joules/cm². Since 0° is the angle of minimum flux, a lower bound estimate for the X-ray fluence emitted into the experimentally observable $2\pi$ steradian solid angle is $2\pi \times (0.43)^2 \times 1.29 = 1.50$ joules, which corresponds to a conversion efficiency of 6.8 percent. The sharp dropoff of the curve in FIG. 33 near 1 keV implies that most of the 6.8 percent is above 1 keV. The appropriate number to compare with theory is the lower bound conversion efficiency of 13.6 percent for X-rays emitted in $4\pi$.*

Another calorimetric measurement used 0.1 mil nickel resistance thermometer elements behind 1 mil of Be or 3000 A of parylene coated with 2000 A of Al. The angular distribution of the X-rays is shown in FIG. 32. The conversion efficiency based on transmission through the thin parylene is about 25 percent over $2\pi$ steradians. The average transmission through 1 mil of Be is about a factor of 5 lower.

VIII. CONCLUSIONS

The main conclusions drawn from this study are the following.

I. Conversion efficiencies of 6–10 percent into $2\pi$ over $\sim 1$ keV have been demonstrated with nanosecond laser pulses on slabs. Slabs of proper thickness will permit use of the full $4\pi$.

II. Slab targets have several advantages for large laser systems. Focusing is simplified, the output is reproducible, and the initial plasma profile is conveniently established with a foot. Amplified spontaneous emission does not disrupt the target. Large outputs can be obtained in a desired pulse shape with a multiple pulse technique, with the pulses sequentially targeted at separate points on the slab.

III. An understanding of the basic phenomenology is essential for optimizing the output. The bulk of the X-rays are produced by spectral lines emanating from the relatively cool ($\leq 1$ kev) leading edge of a thermal diffusion front. A hard component is emitted from a hot low density region with $\sim 1$ percent conversion efficiency, and corresponds to free-free plus free-bound radiation at $\sim 5$ keV electron temperature. The spectrum and conversion efficiencies are strongly modified by the lag in ionization due to nonequilibrium stripping. Nonequilibrium stripping raises line output, lowers free-bound output, and lowers average photon energy. Conversion efficiencies are generally higher than with the Saha Equilibrium ionization model. Strong laser absorption can be predicted without invoking instabilities. The output can be varied by tuning the initial plasma conditions with a foot. Higher-Z elements promise to yield higher average photon energies.

IV. A diminished debris problem due to high conversion efficiency has been demonstrated. Over 1 joule/cm² of soft X-rays were delivered over a usable area, free of debris.

V. The laser must be protected from glass damage caused by light backscattered from targets. An isolation technique has been developed which is applicable to lasers of any aperture.

VI. The nanosecond output of the final stage of the VD-640 can be increased by a factor of five without glass damage. The single pulse output was increased from 100 to 240 joules, and 350 joules were produced in a double pulse mode. At least 500 joules is available in the double pulse mode without serious modification.

Further development promises to provide a unique soft X-ray for medical applications such as cancer therapy, and may also ultimately lead to a brute force X-ray laser. An X-ray laser which produces a joule or so of coherent X-rays would greatly aid the life sciences by providing phase information in X-ray diffraction studies of genetic materials. The interaction of a laser with high-Z matter is also useful for controlled thermonuclear fusion. Although most of the emphasis in laser generated fusion to date has been on low-Z materials, use of a high-Z material in conjunction with deuterium and tritium may lower the threshold laser energies required for controlled thermonuclear fusion.

REFERENCES

1. P. J. Mallozzi, H. M. Epstein, C. T. Walters, D. C. Applebaum, W. J. Gallagher, and J. E. Dennis, J. Appl. Phys. 42, 4531 (1971).
2. J. Dawson, P. Kaw, and B. Green, Phys. Fluids 12, 875 (1969).
3. J. W. Bond Jr., K. M. Watson, and J. A. Welch Jr., *Atomic Theory of Gas Dynamics*, Addison-Wesley Publishing Co., Inc., Reading, Mass. (1965).
4. R. W. P. McWhirter, in *Plasma Diagnostic Techniques*, R. H. Huddlestone and S. L. Leonard, Eds., Chapter 5, Academic Press, New York (1965).
5. J. Dawson and C. Oberman, Phys. Fluids 5, 517 (1962).
6. P. Mallozzi and H. Margenau, Annals of Physics 38, 117 (1966).
7. P. Mallozzi and H. Margenau, Astrophys. J. 137, 851 (1963).
8. A. Burgess, Astrophys. J. 139, 776 (1964).
9. T. F. Stratton, in *Plasma Diagnostic Techniques*, R. H. Huddlestone, and S. L. Leonard, Eds., Chapter 8, Academic Press, New York (1965).
10. P. Mallozzi, *Proposed Research Program to Space and Missile Systems Organization* from Battelle's Columbus Laboratories, classified reference (1967).
11. M. J. Bernstein and G. C. Comisar, J. Appl. Phys. 41, 729 (1969).
12. J. W. Shearer and W. S. Barnes, UCRL-71733, Lawrence Radiation Laboratory, University of California, Livermore (1969).
13. Laser Focus 6, No. 11, 41 (1970).
14. P. K. Fong, Rev. Sci. Instrum. 41, 1434 (1970).
15. F. C. Jahoda, E. M. Little, W. E. Quinn, G. A. Sawyer, and T. F. Stratton, Phys. Rev. 119, 843 (1960).

APPENDIX

Model for Plasma Generated by Foot

The hydrodynamic equations for compressible, inviscid fluid flow are $$\frac{d\rho}{dt} + \rho \nabla \cdot v = 0, \qquad \text{(A-1a)}$$

$$\rho \frac{dv}{dt} + \nabla p = 0, \qquad \text{(A-1b)}$$

$$\rho \frac{d}{dt}(U + \frac{1}{2} v^2) + \nabla \cdot (pv + Q) = 0. \qquad \text{(A-1c)}$$

Here $\frac{d}{dt} = \frac{\delta}{\delta t} + v \cdot \nabla$ is the hydrodynamic time derivative, $v$ is the fluid velocity, and $\rho$, $U$, and $p$ are the mass density, internal energy density per gram, and scalar pressure, respectively. The quantity $Q = -K\Delta T$ accounts for energy transport by heat conduction. To account for the effects of radiation one must include the radiation pressure $p_r$ in the momentum equation, the radiation energy per gram $U_r$ in the energy equation, and add the radiation energy transport vector $\underline{J}$ to the heat conduction vector $\underline{Q}$ in the energy equation. In other words, one makes the transformation $$p \rightarrow p + p_r, \qquad \text{(A-2a)}$$

$$U \rightarrow U + U_r, \qquad \text{(A-2b)}$$

$$\underline{Q} \rightarrow \underline{Q} + \underline{J}. \qquad \text{(A-2c)}$$

To obtain the particular form of the hydrodynamic equations for the foot problem, we ignore Equations (A-2a) and (A-2b) in view of the relations $$p_r << p, \quad \text{(A-3a)}$$

$$U_r << U, \quad \text{(A-3b)}$$

which hold for any temperatures of interest. We also assume that the flow is one dimensional and quasisteady in some region in the vicinity of the solid surface, which allows the $y$, $z$, and $t$ variations to be dropped. The resulting equations are $$V\frac{d\rho}{dx} + \rho\frac{dv}{dx} = 0, \quad \text{(A-4a)}$$

$$\rho v \frac{dv}{dx} + \frac{dp}{dx} = 0, \quad \text{(A-4b)}$$

$$\rho v \frac{d}{dx}(U + \tfrac{1}{2} v^2) + \frac{d}{dx}(pv + Q + J) = 0. \quad \text{(A-4c)}$$

These equations will be solved for the case where the fluid velocity is steeply raised from its value $v_s$ at the solid surface to a value near the asymptotic velocity for continuous isothermal fluid flow, which is given by $$v_\infty = \sqrt{\frac{p_\infty}{\rho_\infty}} = \sqrt{\frac{(Z^*_\infty + 1) k T_\infty}{M}}, \quad \text{(A-5)}$$

where $M$ is the ion mass. The isothermal temperature is limited by blackbody radiation into space and is given by $$I_f \approx \sigma T_\infty^4, \quad \text{(A-6)}$$

where $I_f$ is the foot intensity and $\sigma$ is the Stefan-Boltzmann constant. It is to be understood that quantities denoted by the subscript $\infty$ are applicable only to a given distance from the surface, after which quasisteady conditions break down and Equations (A-4) no longer apply. This point will be discussed later.

Equation (A-4a) immediately integrates to $$\rho v = \dot{m} = \text{constant}, \quad \text{(A-7)}$$

which when substituted into Equation (A-4b) gives $$\dot{m}\frac{dv}{dx} + \frac{dp}{dx} = 0. \quad \text{(A-8)}$$

This integrates to $$\dot{m}v + p = K_1, \quad \text{(A-9)}$$

where the constant $K_1$ may be evaluated with use of Equation (A-7) and the boundary condition (A-5).

$$K_1 = \dot{m}v_\infty + p_\infty = \dot{m}v_\infty + \rho_\infty v_\infty^2 = 2\dot{m}v_\infty. \quad \text{(A-10)}$$

Equation (A-9) may thus be written in the form $$p = \dot{m}(2v_\infty - v). \quad \text{(A-11)}$$

The ratio of vapor pressure at the solid surface to the asymptotic pressure $p_\infty$ is $$\frac{p_s}{p_\infty} = 2 - \frac{v_s}{v_\infty}. \quad \text{(A-12)}$$

In view of the fact that $$\frac{v_s}{v_\infty} << 1, \quad \text{(A-13)}$$

the pressure varies across the region of interest by less than a factor of two. Its maximum value occurs adjacent to the surface and is given approximately by $$p_s \approx 2\dot{m}v_\infty, \quad \text{(A-14)}$$

whereas it approaches the minimum value $$p_\infty = \dot{m}v_\infty \quad \text{(A-15)}$$

with increasing distance.

Equation (A-4c) is also readily integrated, and with use of Equation (A-7) it takes the form $$\dot{m}(U + \tfrac{1}{2} v^2) + \dot{m}\frac{p}{\rho} + Q + J = K_2 = \text{constant}, \quad \text{(A-16)}$$

or equivalently $$\dot{m}(h + \tfrac{1}{2} v^2) + (Q + J) = K_2, \quad \text{(A-17)}$$

where $h$ is the enthalpy per unit mass.

$$h = U + p/\rho \quad \text{(A-18)}$$

The rate of mass removal $\dot{m}$ may be estimated with use of the approximate boundary conditions $$Q_\infty + J_\infty \approx -I_f, \quad \text{(A-19)}$$

$$Q_s + J_s \approx -\dot{m}H, \quad \text{(A-20)}$$

where H is the energy per gram required to vaporize the solid. Equation (A-19) neglects the energy reradiated into space (which appears in practice to never exceed ½ the incident energy). Equation (A-20) assumes that most of the energy absorbed by the solid ends up in vapor rather than a liquid or a heated solid. Use of the boundary condition (A-19) in Equation (A-17) leads to an expression for the constant $K_2$, which when inserted back into Equation (A-17) together with the boundary condition (A-20) gives $$\dot{m}(h_s + \tfrac{1}{2} v_s^2) - \dot{m}H = \dot{m}(h_\infty + \tfrac{1}{2} v_\infty^2) - I_f. \quad \text{(A-21)}$$

This equation may be solved for $\dot{m}$.

$$\dot{m} \approx \frac{I_f}{H + (h_\infty - h_s) + \tfrac{1}{2}(v_\infty^2 - v_s^2)} \quad \text{(A-22)}$$

In the regimes of interest, $h_\infty >> h_s$, $h_\infty >> H$, and $v_\infty >> v_s$, so that Equation (A-22) reduces to $$\dot{m} \approx \frac{I_f}{h_\infty + \tfrac{1}{2} v_\infty^2}. \quad \text{(A-23)}$$

The denominator may be written in a more useful form with the help of Equations (A-18), (A-5), and (A-6), and the approximation that the ionization energy per gram, $U_I$, is double the kinetic energy per gram, $U_K$. This approximation is reasonable for high-Z plasmas which are not fully ionized. Thus, $$h_\infty + \frac{1}{2}v_\infty^2 = U_\infty + \frac{p_\infty}{\rho_\infty} + \frac{1}{2}v_\infty^2 = U_\infty + \frac{3}{2}v_\infty^2$$

$$= U_K + U_I + \frac{3}{2}v_\infty^2 \approx 3U_K + \frac{3}{2}v_\infty^2$$

$$= \frac{9}{2}(\overline{Z_\infty^*} + 1)\frac{kT_\infty}{M} + \frac{3}{2}(\overline{Z_\infty^*} + 1)\frac{kT_\infty}{M}$$

$$= 6(\overline{Z_\infty^*} + 1)\frac{kT_\infty}{M}$$

$$= 6(\overline{Z_\infty^*} + 1)\frac{k}{M}\sigma^{-\frac{1}{3}}I_f^{\frac{1}{3}}, \quad (A\text{-}24)$$

which leads to our key result $$\dot{m} = \frac{M\sigma^{\frac{2}{3}}}{6(\overline{Z_\infty^*} + 1)k}I_f^{\frac{2}{3}}. \quad (A\text{-}25)$$

The total number of ions/cm² removed by the foot during the pulsewidth $\tau_f$ is $$N_i = \frac{\dot{m}}{M}\tau_f \approx \frac{\sigma^{\frac{2}{3}}}{6(\overline{Z_\infty^*}+1)k}I_f^{\frac{2}{3}}\tau_f. \quad (A\text{-}26)$$

Ready formulas for the plasma temperature, plasma thickness, and average ion density are obtained from Equations (A-5) and, (A-6), and (A-26).

$$T_\infty \approx \sigma^{-\frac{1}{3}}I_f^{\frac{1}{3}} \quad (A\text{-}27)$$

$$d \approx v_\infty \tau_f = \left(\frac{(\overline{Z_\infty^*}+1)k}{M}\right)^{\frac{1}{2}}\sigma^{-\frac{1}{6}}I_f^{\frac{1}{6}}\tau_f \quad (A\text{-}28)$$

$$(n_i)_{av} \approx \frac{N_i}{d} = \frac{M^{\frac{1}{2}}\sigma^{\frac{5}{6}}}{6(\overline{Z_\infty^*}+1)^{3/2}k^{3/2}}I_f^{\frac{1}{2}} \quad (A\text{-}29)$$

As mentioned earlier, the fluid flow is quasisteady only out to a given distance from the surface. However, Formulas (A-25) and (A-26) are independent of that fact, and only require that the quasisteady equations and the associated asymptotic description be valid out to that point. Formula (A-27) is also generally applicable if the sharply varying region near the solid surface is ignored. The only formulas that might be changed due to nonsteady flow are (A-28) and (A-29). But formula (A-27) essentially eliminates that possibility by requiring that most of the absorbed energy be tied up in internal energy, which prevents the average fluid velocity from increasing much beyond $V_\infty$.

The study reported herein is described in greater detail in the Final Report on X-Ray Emission from Laser Generated Plasmas to Advanced Research Projects Agency, Volume I, Jan. 28, 1972, and Volume II, Feb. 29, 1972, by P. J. Mallozzi, H. M. Epstein, R. G. Jung, D. C. Applebaum, B. P. Fairand, and W. J. Gallagher of Battelle Columbus Laboratories, 505 King Avenue, Columbus, Ohio 43201. It is described in approximately the same detail in the Invited Paper on X-Ray Emission from Laser Generated Plasmas to VII International Quantum Electronics Conference, Montreal, May 8–11, 1972, by the same authors; and briefly in a news item, "Laser plus iron target: broad-band X-ray source" by Gloria B. Lubkin, in Physics Today, Jan. 1972, page 20.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of producing X-rays that comprises directing radiant energy from a laser onto a target, wherein conversion efficiency of at least about 3 percent is obtained by providing the radiant energy in a low-power precursor pulse of approximately uniform effective intensity focused onto the surface of the target for about 1 to 30 nanoseconds so as to generate an expanding unconfined coronal plasma having less than normal solid density throughout and comprising a low-density (underdense) region wherein the plasma frequency is less than the laser radiation frequency and a higher-density (overdense) region wherein the plasma frequency is greater than the laser radiation frequency and, about 1 to 30 nonoseconds after the precursor pulse strikes the target, a higher-power main pulse focused onto the plasma for about $10^{-3}$ to 30 nanoseconds and having such power density and total energy that the radiant energy is absorbed in the underdense region and conducted into the overdense region to heat it and thus to produce X-rays therefrom with the plasma remaining substantially below normal solid density and thus facilitating the substantial emission of X-rays in the form of spectral lines arising from nonequilibrium ionization states.

2. A method as in claim 1, wherein the target consists essentially of an element having a high atomic number Z.

3. A material as in claim 1, wherein the element has an atomic number Z greater than 10.

4. A method as in claim 1, wherein the target consists essentially of iron, calcium, chromium, nickel, aluminum, lead, tungsten, or gold.

5. A method as in claim 1, wherein the amplitude, duration, and shape of the precursor pulse are adjusted to control the intensity and spectral content of the X-rays.

6. A method as in claim 1, wherein the precursor pulse comprises about 0.01 to 5 joules.

7. A method as in claim 1, wherein the precursor pulse comprises about $10^{10}$ to $10^{12}$ watts per square centimeter.

8. A method as in claim 1, wherein the precursor pulse strikes the target at an angle of about 20° to 70° from its surface.

9. A method as in claim 1, wherein the main pulse comprises at least about 0.1 joule.

10. A method as in claim 1, wherein the main pulse comprises about 10 to 200 joules in about 1 to 3 nanoseconds.

11. A method as in claim 1, wherein the target consists essentially of iron and the duration of the precursor pulse is about 8 to 10 nanoseconds.

12. A method as in claim 1, wherein the electron density in the low-density region of the plasma is about $10^{16}$ to $10^{21}$ per cubic centimeter.

13. A method as in claim 1, wherein the electron density in the higher-density region of the plasma is about $10^{19}$ to $10^{23}$ per cubic centimeter.

14. A method as in claim 1, wherein the radiant energy is focused onto a spot on the target having a diameter of about 10 to 1000 microns.

15. A method as in claim 1, wherein the volume of the plasma is about $10^{-6}$ to $10^{-3}$ cubic centimeter.

16. A method as in claim 1, wherein the thickness of the plasma in any direction is about 0.001 to 0.1 centimeter.

17. A method as in claim 1, wherein for low energy applications the X-rays are emitted predominantly in the form of spectral lines.

18. A method as in claim 1, wherein the radiant energy is focused onto a spot on the target having a diameter of about 10 to 100 microns, generating a plasma of about the same diameter, to form substantially a point source of X-rays and thus to provide substantially the advantages of stimulated emission of X-rays.

19. A method as in claim 1, wherein the composition of the target and the temperature of the plasma are selected to provide a substantial amount of stimulated emission of X-rays.

20. A method as in claim 1, wherein a substantial proportion of the X-rays produced are directed to impinge upon a fluorescent target so as to remove inner shell electrons from atoms thereof and thereby create a population inversion.

* * * * *